United States Patent
Yanase et al.

(10) Patent No.: US 9,904,464 B2
(45) Date of Patent: Feb. 27, 2018

(54) TOUCH SENSOR DEVICE AND ELECTRONIC DEVICE

(71) Applicant: NLT Technologies, Ltd., Kawasaki, Kanagawa (JP)

(72) Inventors: Jiro Yanase, Kawasaki (JP); Yoshihiro Nonaka, Kawasaki (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 102 days.

(21) Appl. No.: 14/579,711

(22) Filed: Dec. 22, 2014

(65) Prior Publication Data

US 2015/0177980 A1    Jun. 25, 2015

(30) Foreign Application Priority Data

Dec. 24, 2013  (JP) .................................. 2013-264864
Aug. 6, 2014  (JP) .................................. 2014-160645

(51) Int. Cl.
*G06F 3/0488* (2013.01)
*G06F 3/044* (2006.01)
*G06F 3/041* (2006.01)

(52) U.S. Cl.
CPC .......... *G06F 3/04883* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 5,502,803 A | * | 3/1996 | Yoshida | G06F 17/24 345/179 |
| 2003/0214485 A1 | * | 11/2003 | Roberts | G06F 3/0418 345/173 |
| 2009/0115742 A1 | * | 5/2009 | Mamba | G06F 3/044 345/174 |

(Continued)

FOREIGN PATENT DOCUMENTS

| | | |
|---|---|---|
| JP | 01-019176 B2 | 4/1989 |
| JP | 09-511086 A | 11/1997 |

(Continued)

*Primary Examiner* — Antonio Xavier
(74) *Attorney, Agent, or Firm* — Sughrue Mion, PLLC

(57) ABSTRACT

A touch sensor device includes: an impedance surface where plural sets of reference coordinates are set at plural locations; plural detection electrodes arranged on the impedance surface; a detection circuit configured to detect electric currents passing the detection electrodes; a storage section storing reference standardized values and reference normalized values; a position coordinate calculation section configured to obtain standardized values calculated by standardizing the electric currents detected in each detection period and to map the standardized values onto position coordinates; a first normalized value calculation section configured to map the position coordinates onto first normalized values; a second normalized value calculation section configured to calculate second normalized values by normalizing the electric currents in each detection period; and a touch gesture detection section configured to detect a motion of pointers on the basis of a time variation of the first normalized values and the second normalized values.

15 Claims, 29 Drawing Sheets

(56) References Cited

U.S. PATENT DOCUMENTS

| | | | | |
|---|---|---|---|---|
| 2009/0201268 A1* | 8/2009 | Endo | G06F 3/045 | 345/174 |
| 2011/0025628 A1* | 2/2011 | Lin | G06F 3/0418 | 345/173 |
| 2011/0157070 A1* | 6/2011 | Martin | G06F 3/0416 | 345/174 |
| 2011/0279169 A1* | 11/2011 | Salaverry | G06F 3/0416 | 327/517 |
| 2011/0304589 A1* | 12/2011 | Yoshida | G06F 3/0416 | 345/175 |
| 2012/0050205 A1* | 3/2012 | Kao | G06F 3/044 | 345/174 |
| 2012/0092296 A1* | 4/2012 | Yanase | G06F 3/0416 | 345/174 |
| 2012/0206330 A1* | 8/2012 | Cao | G06F 3/0383 | 345/156 |
| 2013/0154952 A1* | 6/2013 | Hinckley | G06F 1/1694 | 345/173 |
| 2013/0169584 A1* | 7/2013 | Konradi | G06F 3/044 | 345/174 |
| 2013/0265263 A1* | 10/2013 | Westerman | G06F 3/0235 | 345/173 |
| 2014/0380189 A1* | 12/2014 | Hata | G06F 1/1681 | 715/752 |
| 2015/0099587 A1* | 4/2015 | Lees | A63F 13/33 | 463/42 |

FOREIGN PATENT DOCUMENTS

| | | |
|---|---|---|
| JP | 2005-505065 A | 2/2005 |
| JP | 2010-157029 A | 7/2010 |
| WO | 80/001762 A1 | 9/1980 |
| WO | 95/027334 A1 | 10/1995 |
| WO | 03/030091 A1 | 4/2003 |

* cited by examiner

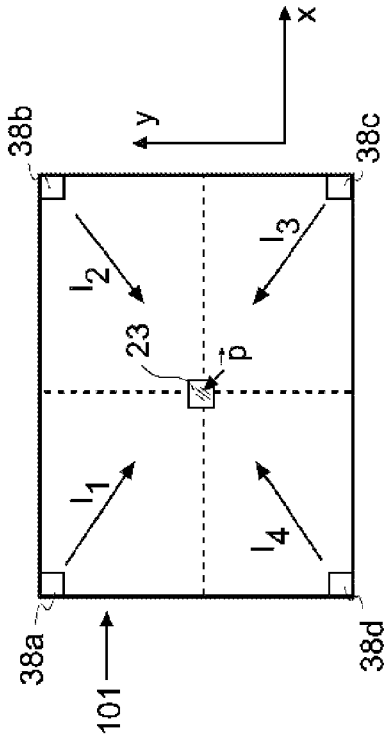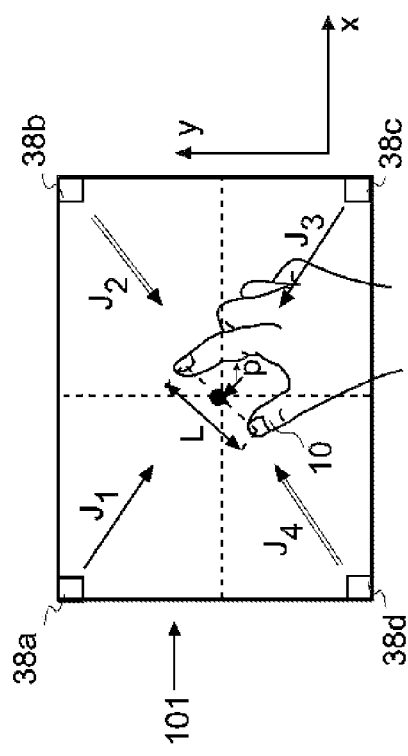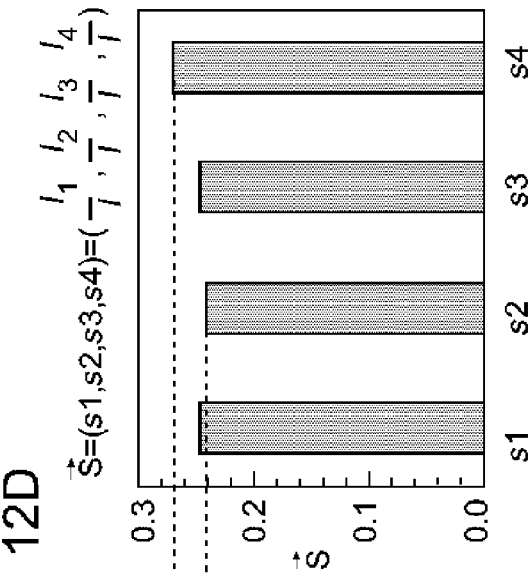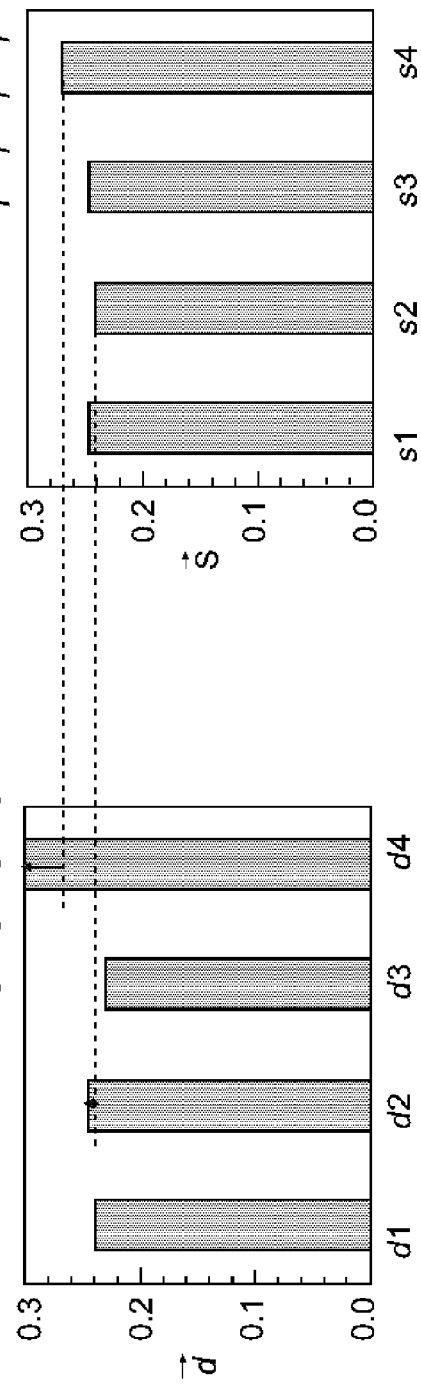
FIG. 12A
FIG. 12B
FIG. 12C
FIG. 12D

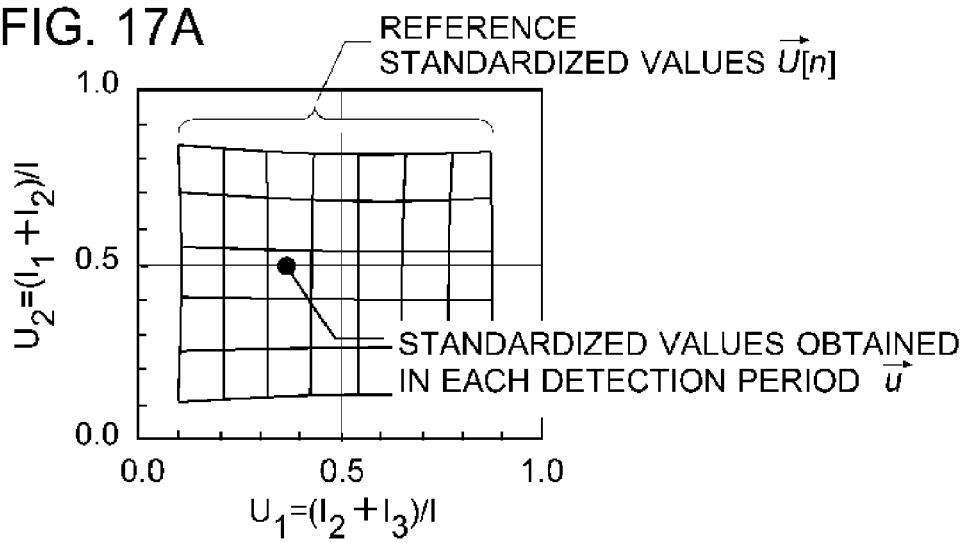
FIG. 17A
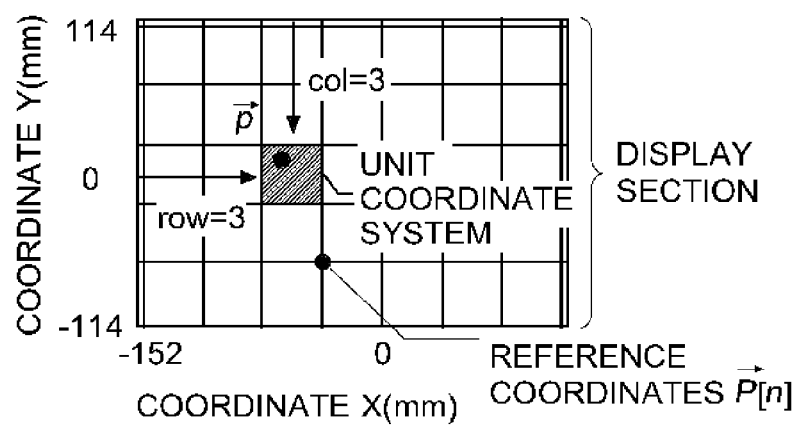
FIG. 17B
FIG. 18A
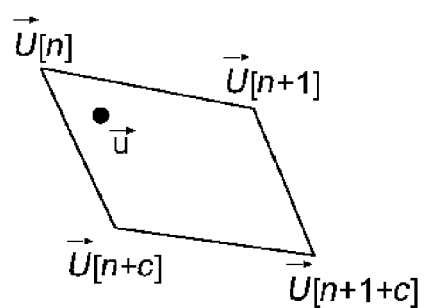
FIG. 18B
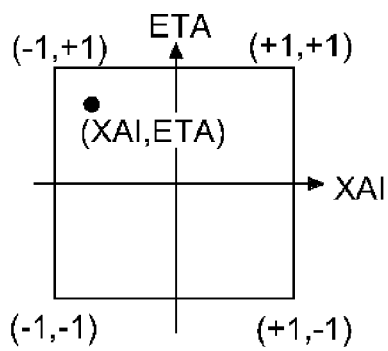

FIG. 20A
FIG. 20B
FIG. 20C
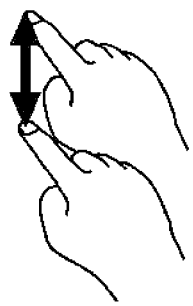
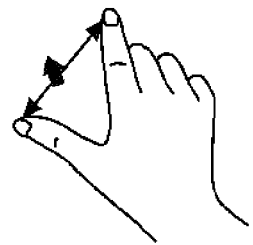
FIG. 21A
FIG. 21B
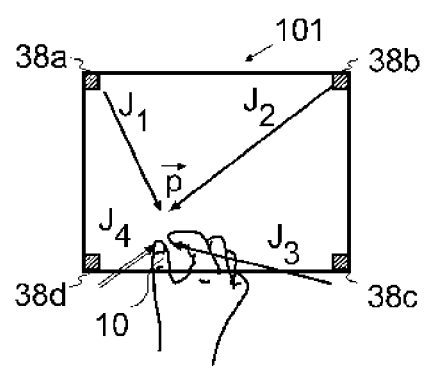
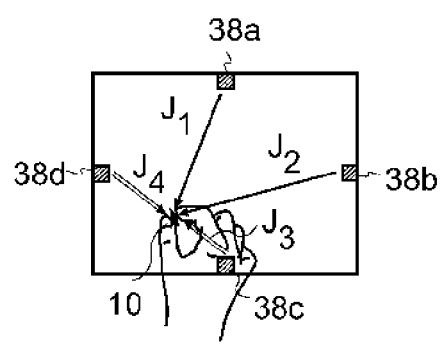

COORDINATE CHANGE OF
TWO-POINT TOUCHES IN
PINCH GESTURE OPERATION

TOUCH SENSOR DEVICE AND ELECTRONIC DEVICE

TECHNICAL FIELD

The present invention relates to a touch sensor device of capacitive sensing type and an electronic device including the touch sensor device.

BACKGROUND

Touch sensor devices are devices that detect coordinates of a position pointed using a pointer, such as a fingertip and a pen, or occurrence of a pointing operation. Usually, touch sensor devices are used in combination with surface display devices, such as a liquid crystal display (hereafter referred to as "LCD") and an organic electro-luminescence display (hereafter referred to as "organic EL display").

User-friendly man-machine interface can be achieved by inputting an output of a touch sensor device to a computer, and controlling the display content in the display unit or controlling instruments by the computer. Touch sensor devices are widely used in everyday life now, such as in a game machine, a personal digital assistant, a ticket vending machine, an ATM (automated teller machine), and a car navigation device. In addition, as performance of computers have become higher and network connection environment has become popular, services provided by electronic devices have diversified. Accordingly, there is an increasing demand for a display unit having a touch sensor device.

Examples of known techniques for touch sensor devices include capacitive sensing type, resistance film type, optical type, ultrasonic type, and electromagnetic induction type. Among such touch sensor devices, a touch sensor device of capacitive sensing type detects a touch of a pointer through a thin material, for example, a thin glass or plastic. Thus, it is not necessary to push the device strongly upon the touch, and thus touch sensor devices of capacitive sensing type are excellent in durability against repeated inputs. By having such a feature, touch sensor devices of capacitive sensing type are widely used in many application fields where durability is needed, such as in industrial use products and white goods (large household appliances).

Such touch sensor devices of capacitive sensing type are classified into projected capacitive type and surface capacitive type.

A projected capacitive type is a type that forms X-Y transparent electrodes in matrix form. X transparent electrodes and Y transparent electrodes are formed with, for example, a glass or insulator layer put between them. When a pointer approaches the X-Y transparent electrodes, the electrostatic capacity between the electrodes increases. A controller detects the change in the electrostatic capacity of X-Y lines, and thus the position of the touching pointer is detected. Since transparent electrode groups that are arranged in parallel to each other are electrically isolated, it is possible to support a multi-touch operation which requires that a plurality of input points being detected simultaneously. By touching the screen with a plurality of fingers simultaneously, it is possible to rotate the target and adjust the resolution of displaying images, for example. For example, Japanese Translation of PCT International Application (JP-A) No. H09-511086 discloses such a technique of projected capacitive type.

Meanwhile, a touch sensor device of surface capacitive type includes: a transparent insulation substrate; a transparent conductive layer uniformly formed on a surface of the transparent insulation substrate; and a thin insulating layer formed on the transparent conductive layer. When driving a touch sensor device of surface capacitive type, AC voltage is applied from detection electrodes formed at four corners of the transparent conductive layer. Upon a user touching the surface of the touch sensor device with a pointer, micro-current flows into the pointer via electrostatic capacity formed by the transparent conductive layer and the pointer. The micro-current flows from each of the detection electrodes at four corners to the point touched by the pointer. The controller detects each of the current values of the micro-currents from the detection electrodes. As the pointer comes closer to one of the detection electrodes, the corresponding electric current increases. Accordingly, the coordinates of the touch position are calculated by using a lack of balance among the four electric currents. For example, Japanese Examined Patent Publication (JP-B) H01-019176 discloses a technique related to such a touch sensor device of surface capacitive type.

The touch sensor device of surface capacitive type represented by JP-B No. H01-019176 has a simple structure of only a transparent conductive film having a uniform touch sensor portion, and detection electrodes formed at four corners of the touch sensor portion. In addition, the number of detection electrodes is fixed, specifically, four, for touch sensor devices with various screen sizes, which brings the advantage that a flexible printed circuit board (hereinafter referred to as FPC (flexible printed circuit)) and a controller can be used universally (commonly) for those touch sensor devices. Accordingly, the touch sensor device of surface capacitance type has an economical structure.

Japanese Translation of PCT International Application (JP-A) No. 2005-505065 discloses an attempt to support multi-touch operations in a touch sensor device that supports only single-touch operations. In JP-A No. 2005-505065, it is determined whether each operation is touching the sensor or moving away from the sensor on the basis of characteristics of time variation of signals. When a single touch and a double touch in which two touches overlap in time have been conducted in order, the coordinates of the second touch position are calculated and reported by subtracting signal data obtained on the single touch (the first touch) that is a touch conducted before the second touch from signal data obtained on the double touch. When a double touch and a single touch have been conducted in order, the coordinates of the position of an unreported single touch, that is, the first touch position, is calculated and reported by subtracting signal data of the second touch, which is a single touch, from signal data obtained on the previous double touch. This technique disclosed in JP-A No. 2005-505065 utilizes that there is a time difference between the time when the first touch is detected and the time when the second touch is detected.

Japanese Unexamined Patent Application Publication (JP-A) No. 2010-157029 describes about a problem that electrostatic capacitive coupling of a user's palm and a surface resistive object affects the inputted coordinates such that the coordinates are shifted from a position actually pointed by a user's finger. In the technology of JP-A No. 2010-157029, it is determined whether the number of touched or approached locations in a coordinate input area is one or two, where the locations are the points which have been touched or approached by an electrical conductor, such as a user's finger. In the technology, a resistance peripheral electrode is formed on the periphery of surface resistance. Then, the number of touched or approached locations is determined as one when a numerical value calculated using the detected current values is smaller than a predetermined value, and two when it is larger than the predetermined value. When the number is determined as two, this means that the user's palm has excessively approaches toward the touch panel. In this case, the touch of the finger is invalidated, and then, the user is prompted to touch again.

The following analysis is given from the viewpoint of the present invention.

The touch sensor device of projected capacitive type represented by JP-A No. H09-511086 has a multi-touch function. However, in order to detect the position coordinates of a pointer correctly, it is necessary to make the pitch of transparent electrodes arranged in parallel smaller than a certain distance. Accordingly, as the screen size increases, the number of transparent electrodes increases. It increases the number of wires to be extending between the transparent electrodes and the controller in the circumference of the touch panel, and the number of terminals of, for example, a FPC. Therefore, the manufacturing cost increases. In addition, an increase of the number of peripheral lines brings a problem of a frame of the touch panel being large.

In a touch sensor device of surface capacitive type represented by JP-B No. H01-019176, it is difficult to detect coordinates of individual touches correctly upon multiple touches by plural pointers. This is because, since electric currents created due to the individual touches join in a uniformly-formed transparent conductive film, the amount of the electric current detected by the controller is the total value of electric currents created due to plural touches, and thus the amount of an electric current corresponding to each of the touches to be used for coordinate detection is not clear. Accordingly, it can be said that a touch panel of surface capacitive type represented by JP-B No. H01-019176 is a touch panel that supports only single touch operations.

In a touch sensor device of surface capacitive type in JP-A No. 2005-505065, although there is a description that two point touches are sequentially recognized using time difference, simultaneous touches cannot be recognized. The reason for this will be described using an example of a pinch gesture operation, which is an operation of conducting a touch with two fingers and then moving the fingers close to each other or apart from one other and is called "pinch-in" and "pinch-out". During a pinch gesture, two fingers move simultaneously, that is, a time zone when the signal created due to the touch of one finger changes overlaps with a tome zone when the signal created due to the touch of another finger changes. Accordingly, even if the signal is deducted using the time difference, the signals corresponding to respective touches cannot be separated and thus each individual signal is unknown. That is, this technique is provided on the assumptions that a detected operation is any one of an operation that one of two fingers is completely stopped, and an operation of time-shifted touches that one of two touches occurs first and then overlaps with the other touch occurring later or one of two touches occurring together ends and then the other touch remains. Such an assumption limits user's operations and makes user's operations awkward and slow, which is a problem.

JP-A No. 2010-157029 discloses a technology to detect an approach of a user's palm by detecting the bonding number of the electrostatic capacity with the surface resistance and its effect that a one-location touch and a two-location touch can be discriminated from each other. However, the technology can identify a two-location touch, but just determines coordinates of one point and hardly determines coordinates of each of two touch locations separately. In addition, JP-A No. 2010-157029 just discloses a function of, if a two-location touch has been identified, invalidating the touch or assigning the touch to a double click function. Further, since the unit of the value calculated by Mathematical Expression 2 described in JP-A No. 2010-157029 is that of electric current, it is difficult to detect a motion of two fingers because of an influence of the individual difference of the impedance caused due to the touch and an influence of dispersion of the touch areas. In addition, since it is necessary to form resistance peripheral electrode in the circumference of a surface resistance, the manufacturing cost for forming the resistance peripheral electrode occurs. The present invention seeks to solve the problems.

SUMMARY

In view of the above-described problems, there are provided illustrative touch sensor devices and illustrative electronic devices, for providing a touch sensor device with a function of detecting a touch operation in which two fingers move simultaneously at low cost, or providing, if a touch panel device that supports only single touch operations has been already employed, a multi-touch function to be added to the touch panel device afterwards to suppress economical burden to the minimum.

A touch sensor device according to an aspect of the present invention comprises: a transparent conductive layer forming an impedance surface, where the impedance surface includes an active area where a human body can touch or approach, and a plurality of sets of reference coordinates are set at a plurality of locations in the active area. The touch sensor device further comprises: a plurality of detection electrodes arranged on the impedance surface; a detection circuit configured to detect electric currents passing the detection electrodes; and a storage section storing reference standardized values and reference normalized values. The reference standardized values correspond to estimated coordinates of each set of the reference coordinates. The reference standardized values are calculated by obtaining electric currents detected by the detection circuit on each set of the reference coordinates being pointed with one pointer and by standardizing the detected electric currents for each set of the reference coordinates. The reference normalized values are calculated by normalizing the detected electric currents so as to make a total sum of the electric currents passing the impedance surface a constant value, for each set of the reference coordinates. The touch sensor device further comprises: a position coordinate calculation section configured to obtain standardized values calculated by standardizing the electric currents detected by the detection circuit in each detection period and to map the standardized values onto position coordinates on a basis of a relation between the reference standardized values stored in advance in the storage section and the reference coordinates. The touch sensor device further comprises: a first normalized value calculation section configured to map the position coordinates onto first normalized values on a basis of a relation between the reference coordinates and the reference normalized values; a second normalized value calculation section configured to calculate second normalized values by normalizing the electric currents detected by the detection circuit in each detection period; and a touch gesture detection section configured to detect a motion of a plurality of pointers on a basis of a time variation of the first normalized values and the second normalized values.

A touch sensor device according to another aspect of the present invention comprises: a transparent conductive layer forming an impedance surface where a human body can touch or approach; a plurality of detection electrodes arranged on the impedance surface; a detection circuit configured to detect electric currents passing the detection electrodes; and a touch gesture detection section configured to detect a motion of a plurality of pointers by using the electric currents detected by the detection circuit, wherein sensitivity to one of a detected pinch-in operation and a detected pinch-out operation both changing a distance between two pointers, is higher at a second angle in comparison with the sensitivity at a first angle. Each of the first angle and the second angle is an angle formed, under a condition that two pointers touch the impedance surface and a midpoint of the two pointers is defined as a center of the impedance surface, by a line connecting the two pointers and a line connecting opposing detection electrodes on the impedance surface in a pinch gesture operation that changes the distance between the two pointers. Further, the first angle and the second angle satisfy:

"first angle"=$(2 \times m-1) \times 180/ET$ and

"second angle"=$360/ET \times (m-1)$, where ET is a number of the detection electrodes and m is an integer from 1 to ET.

An electronic device according to an aspect of the present invention includes: any one of the above-described touch sensor devices.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 12A to 12D is a schematic diagrams and graphs for illustrating the functional block diagram of FIG. 11;

FIGS. 17A and 17B are schematic diagrams for illustrating a process of searching for a lattice region according to EMBODIMENT 3;

FIGS. 18A and 18B are schematic diagrams for illustrating a process of mapping standardized values according to EMBODIMENT 3;

FIGS. 20A to 20C are schematic diagrams for illustrating erroneous detection of a touch gesture according to EMBODIMENT 4;

Figure 22A:
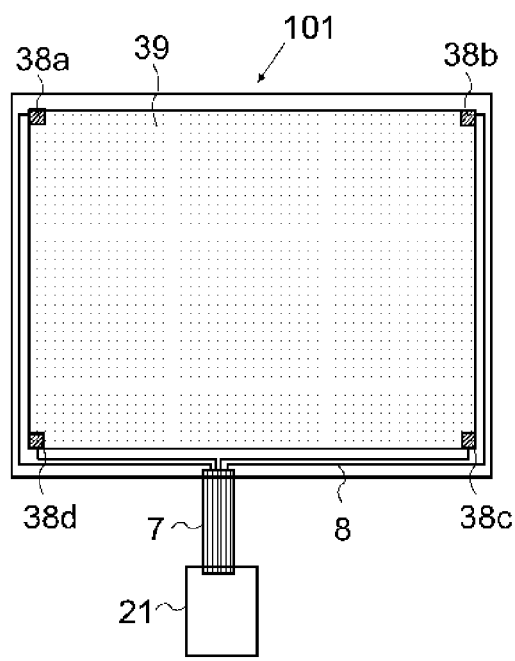
Figure 22B:
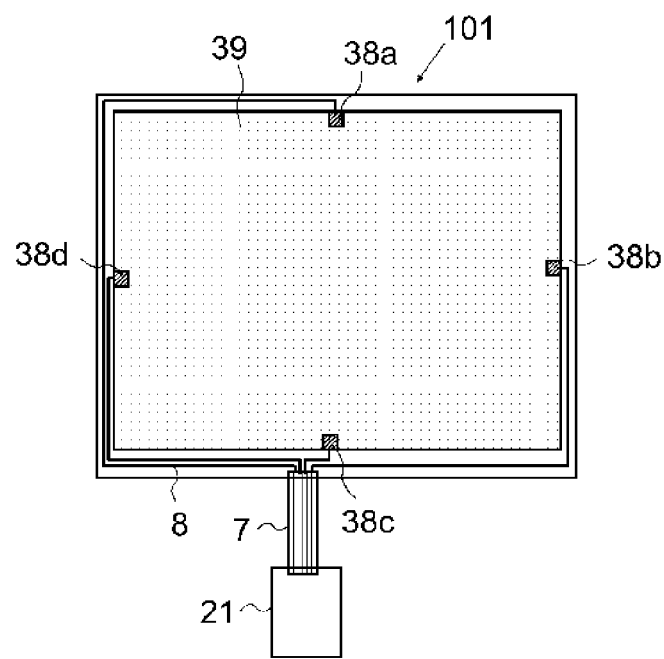
Figure 23A:
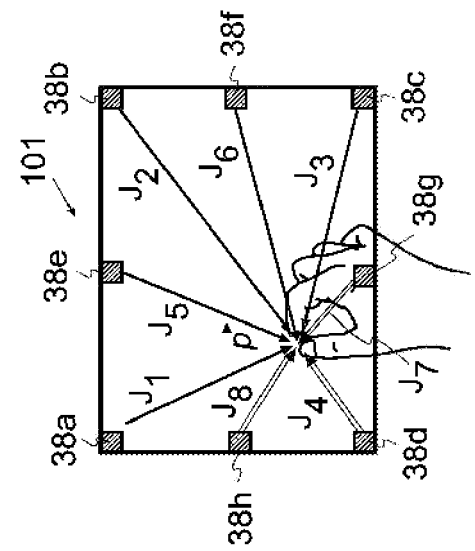
Figure 23B:
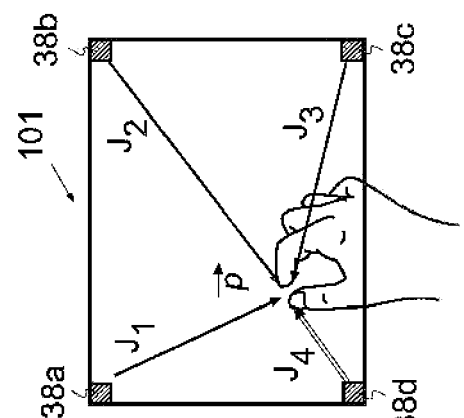
Figure 23C:
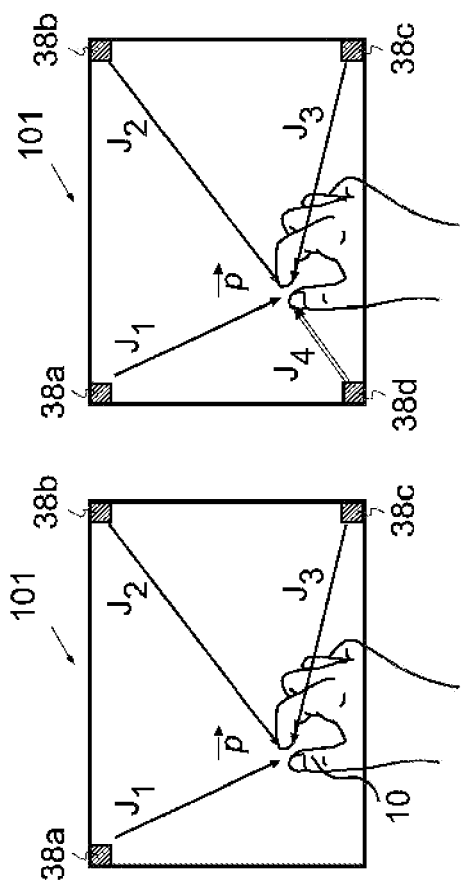
Figure 24:
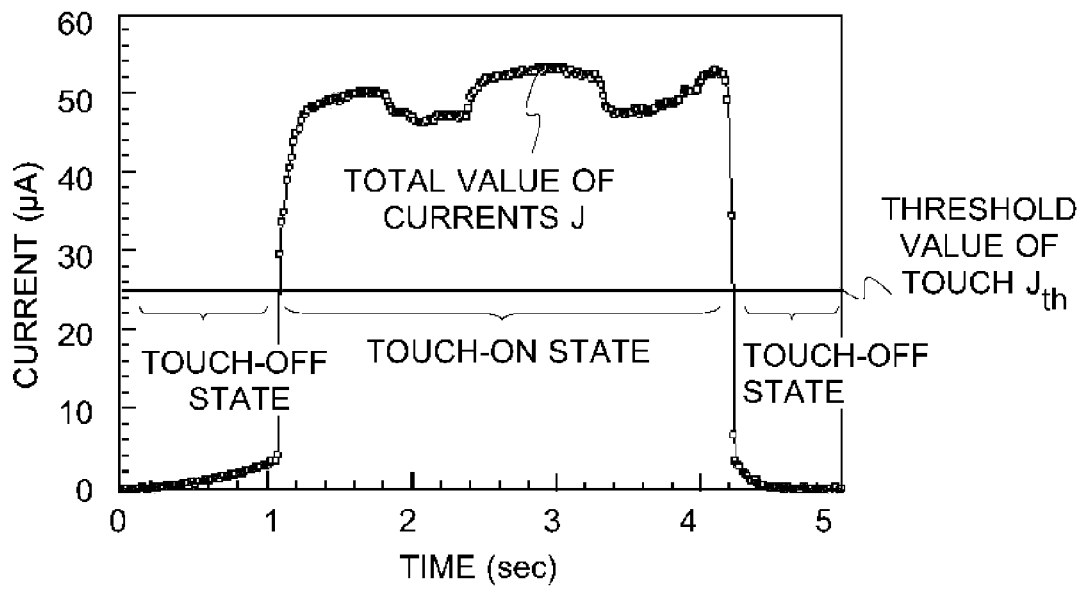
Figure 25:
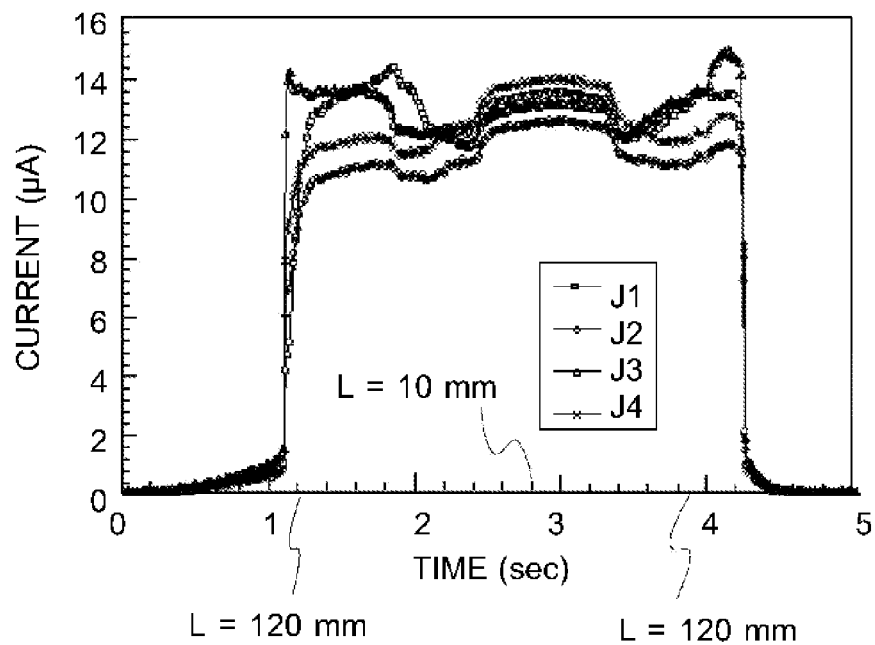
Figure 26:
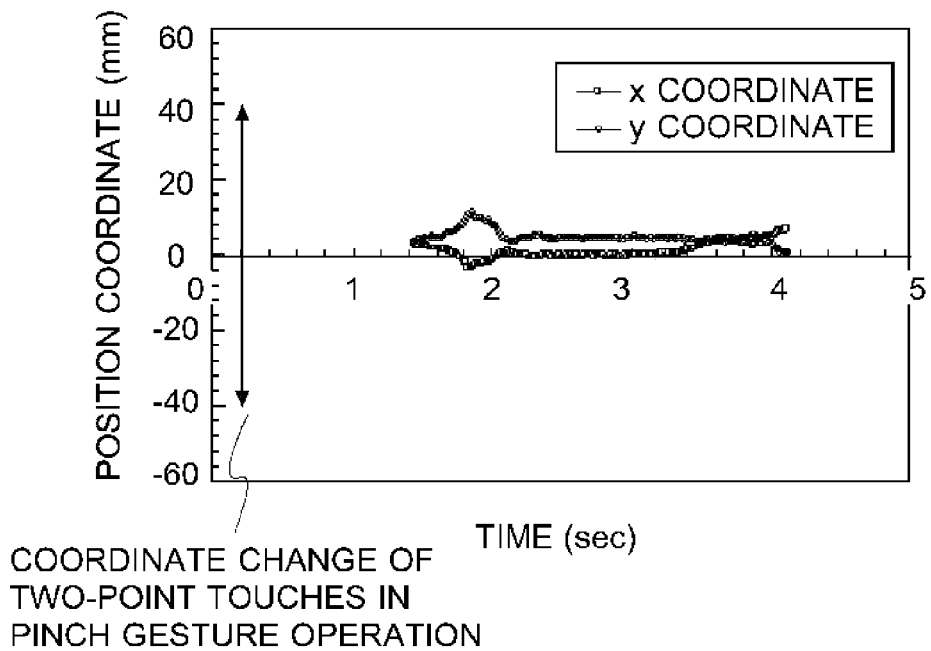
Figure 27:
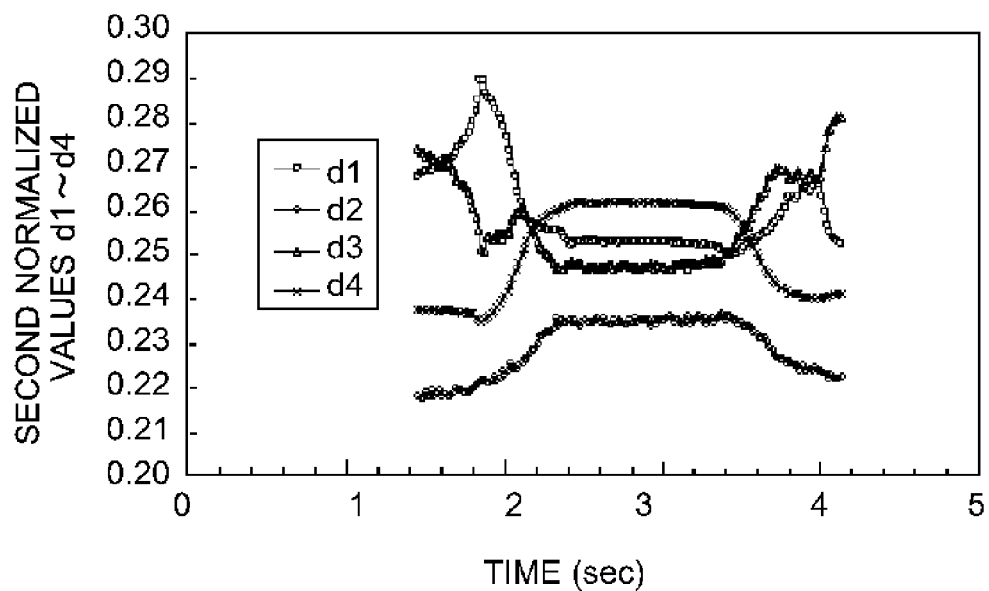
Figure 28:
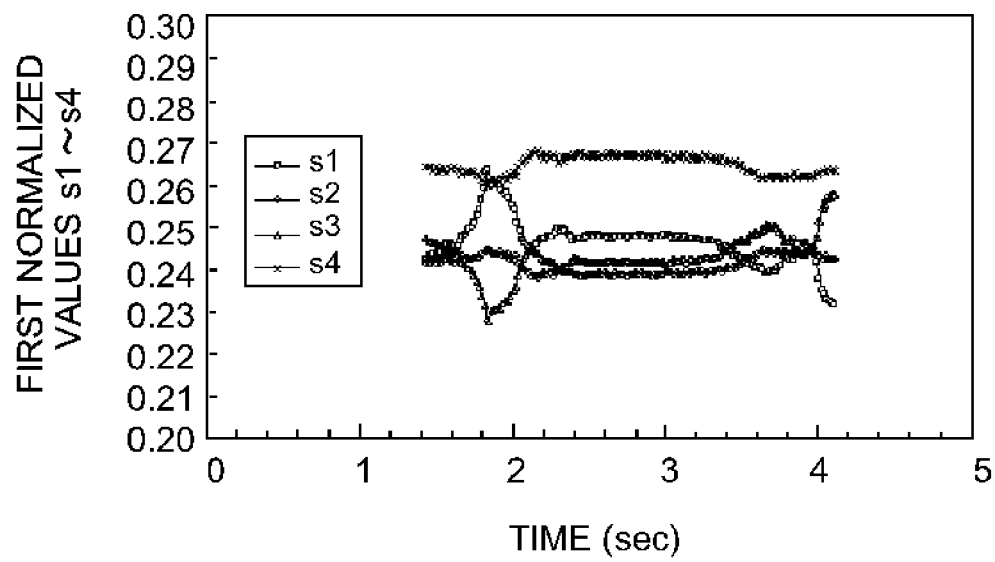
Figure 29:
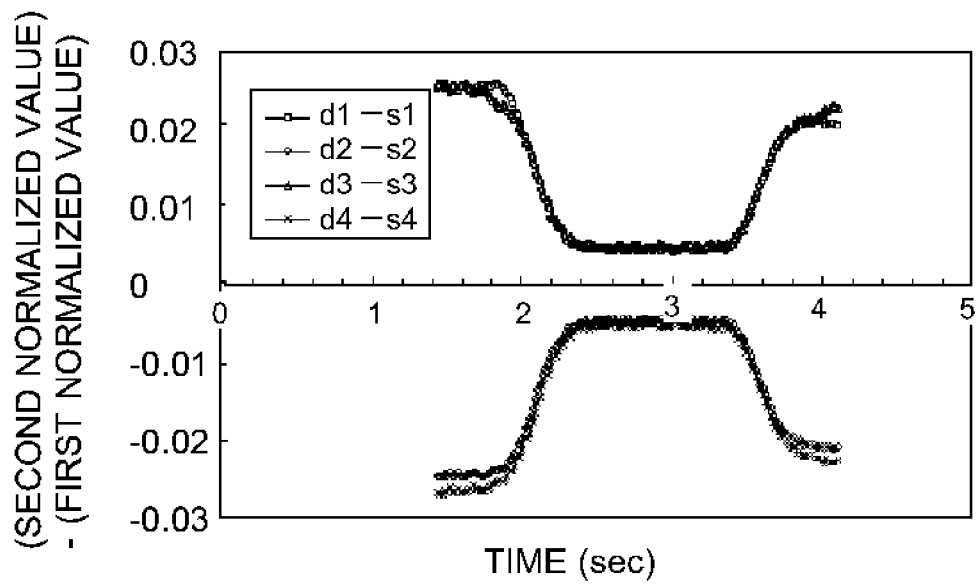
Figure 30:
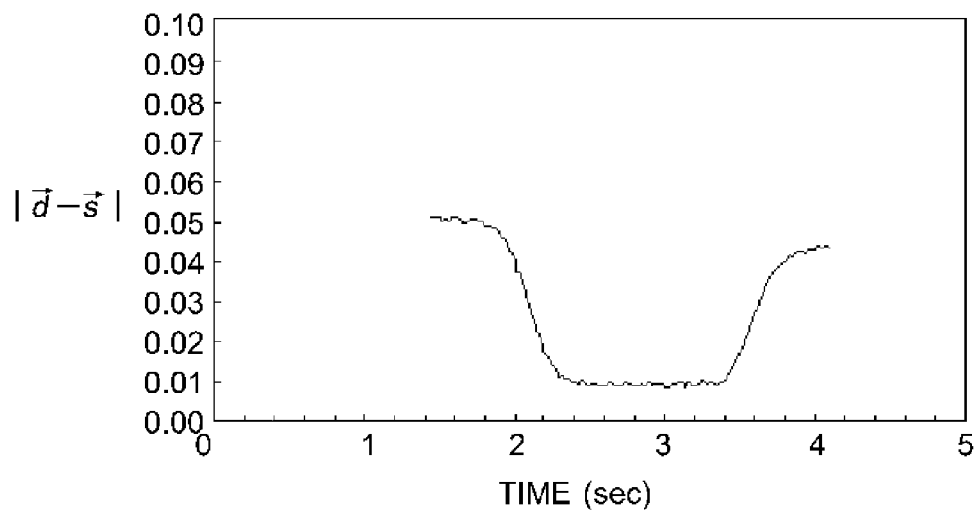
Figure 31:
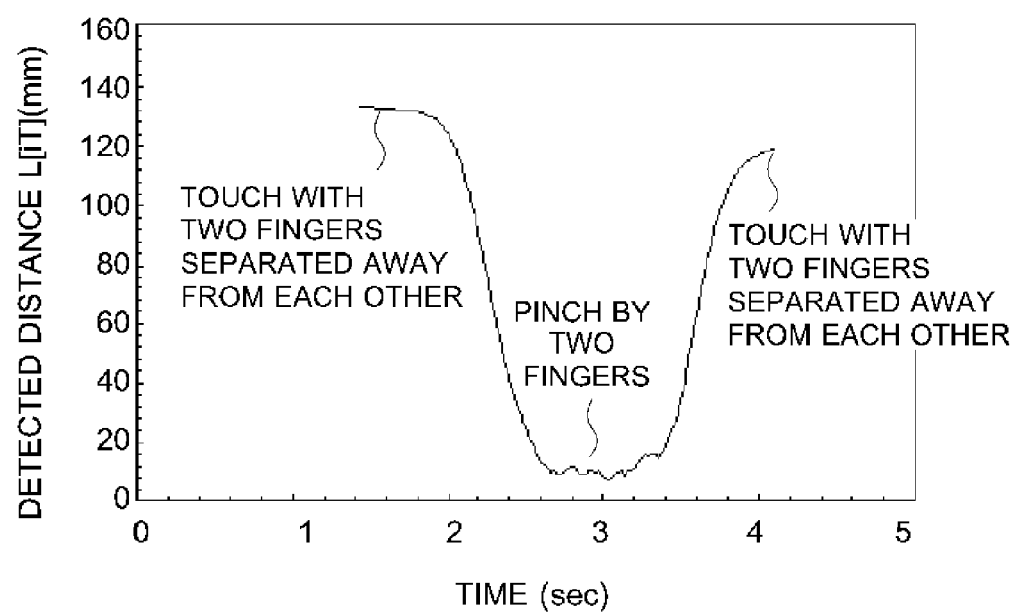
Figure 32:
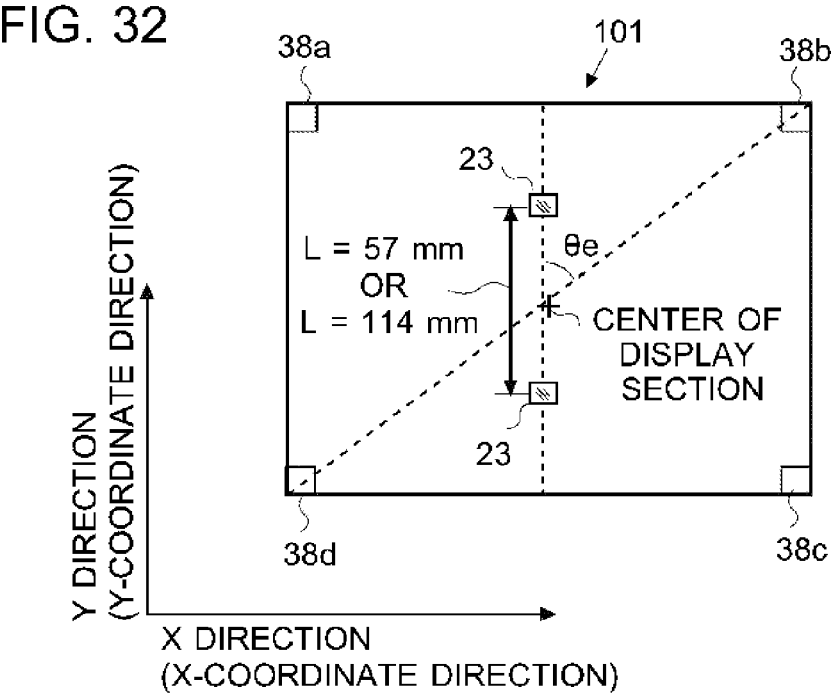
Figure 33:
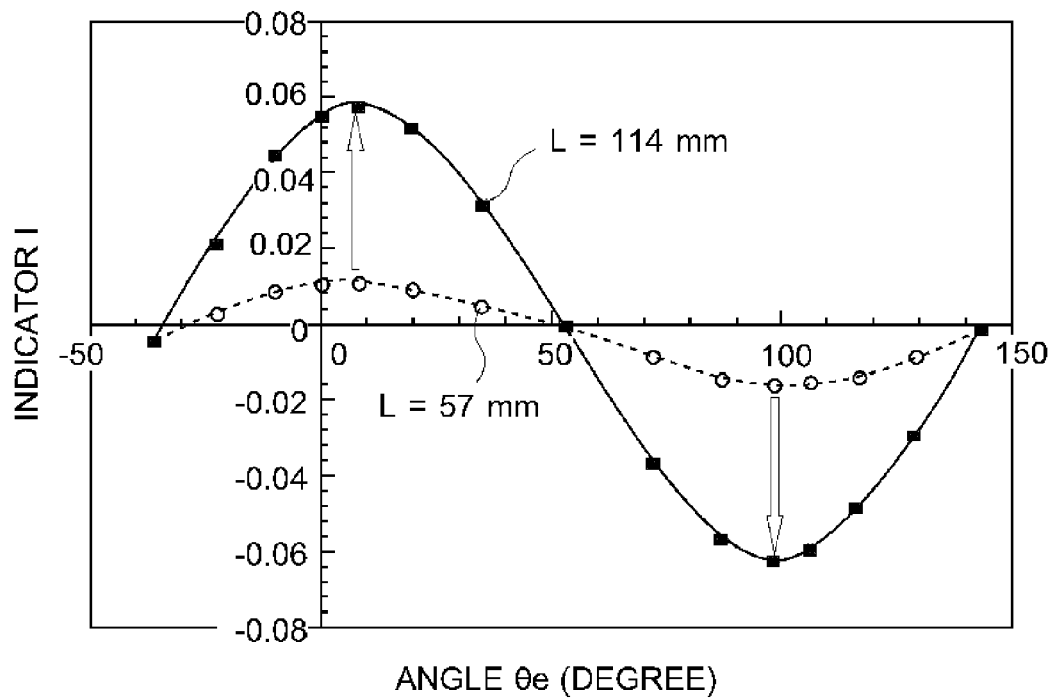
Figure 34:
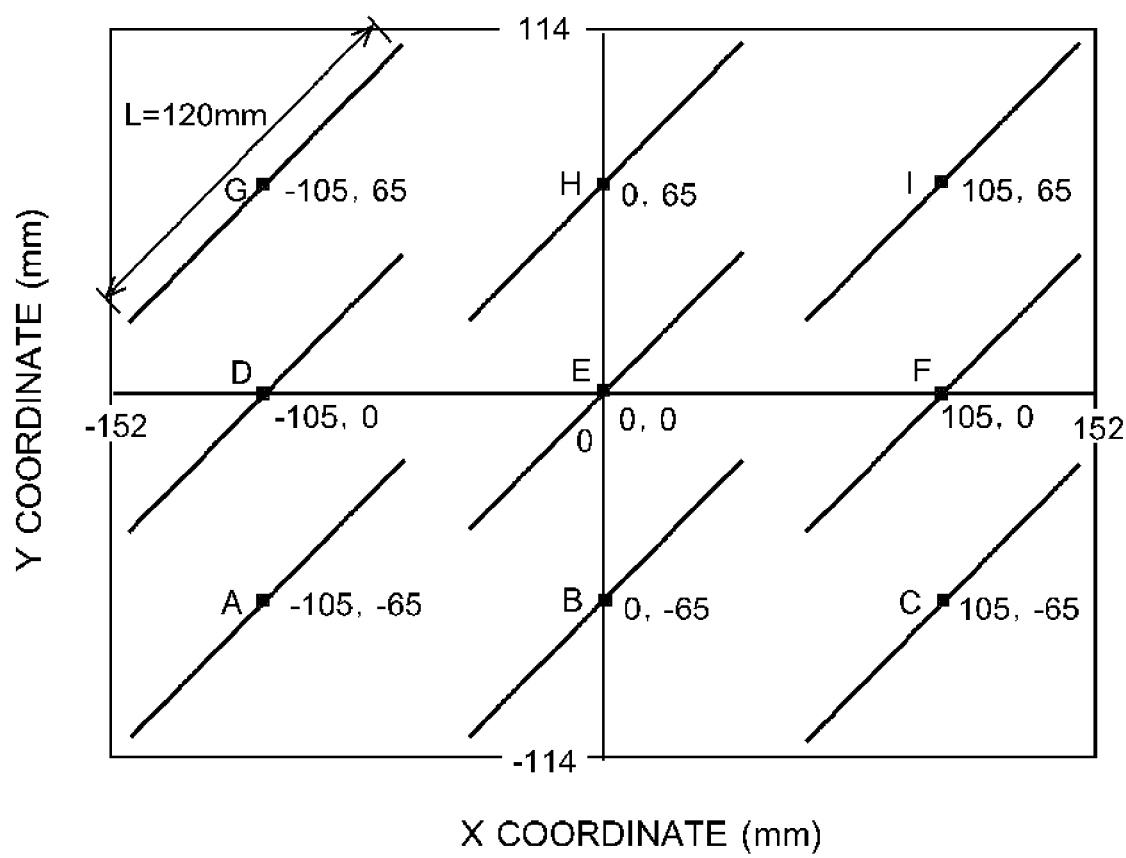
Figure 35:
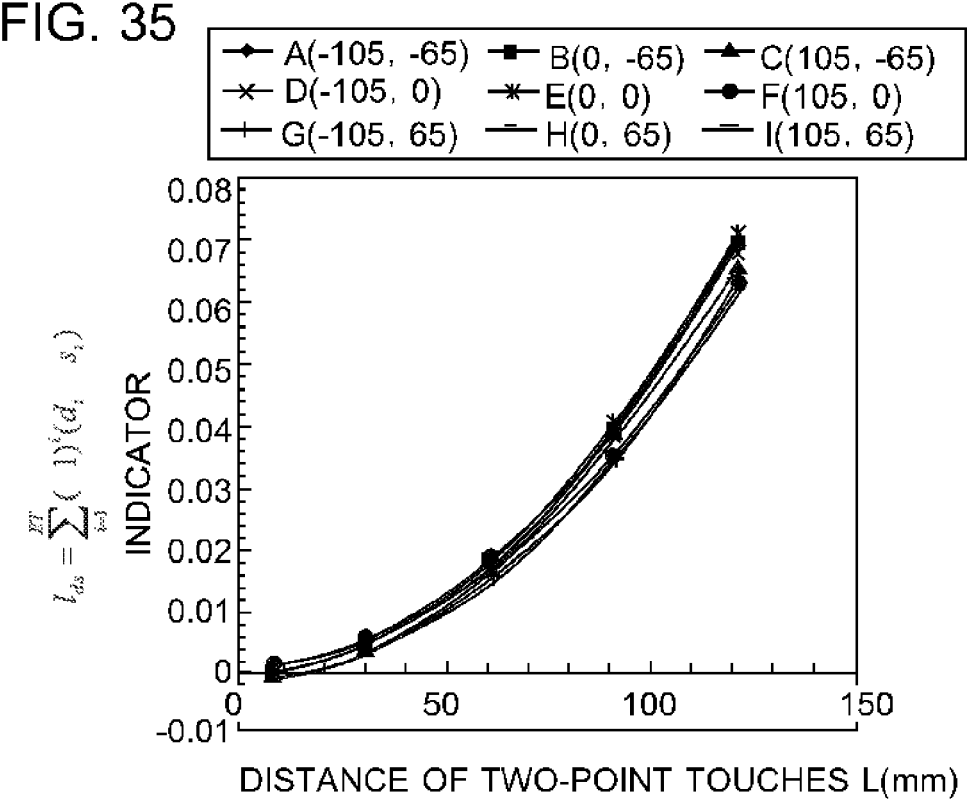
Figure 36:
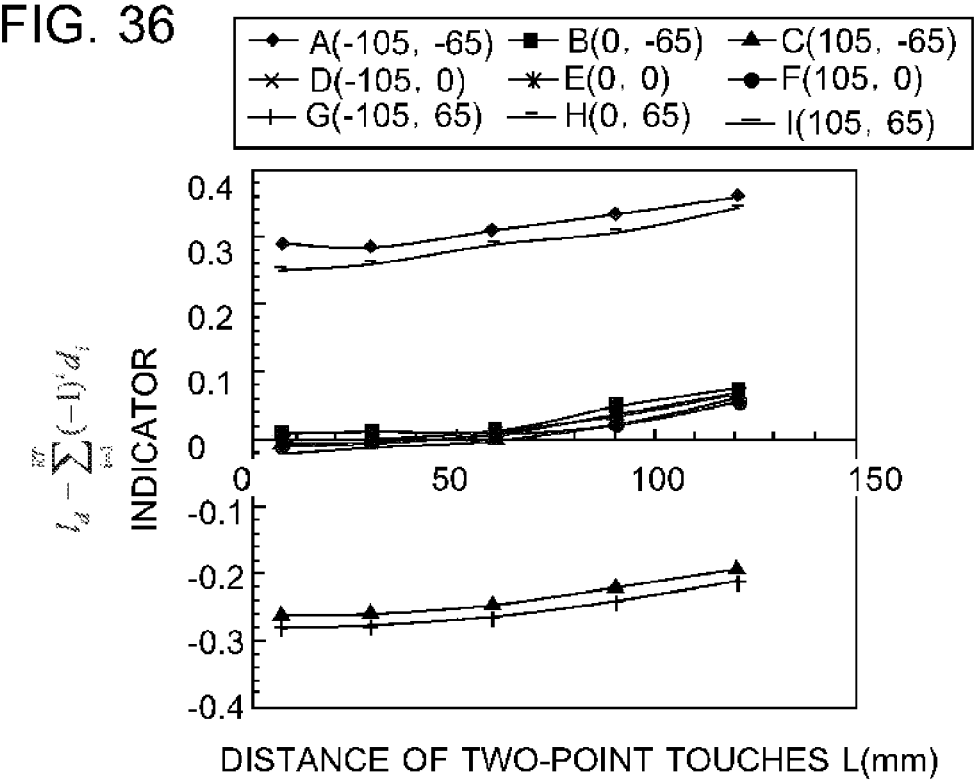
Figure 37:
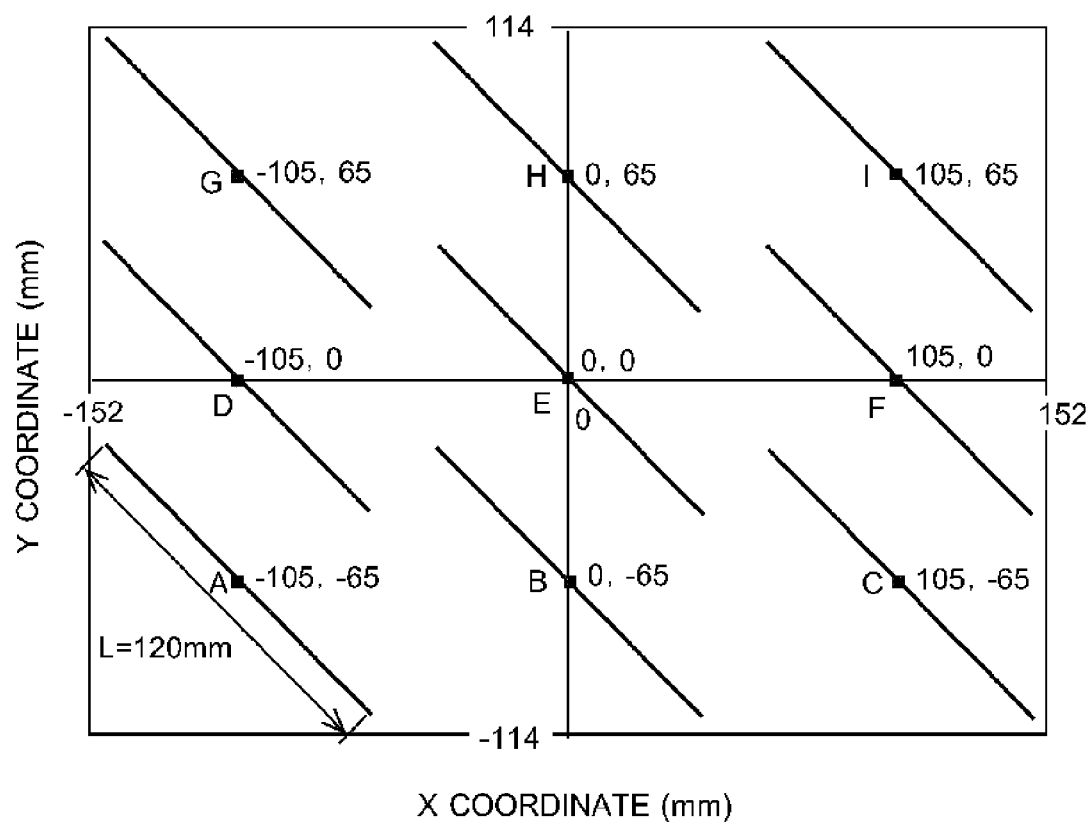
Figure 38:
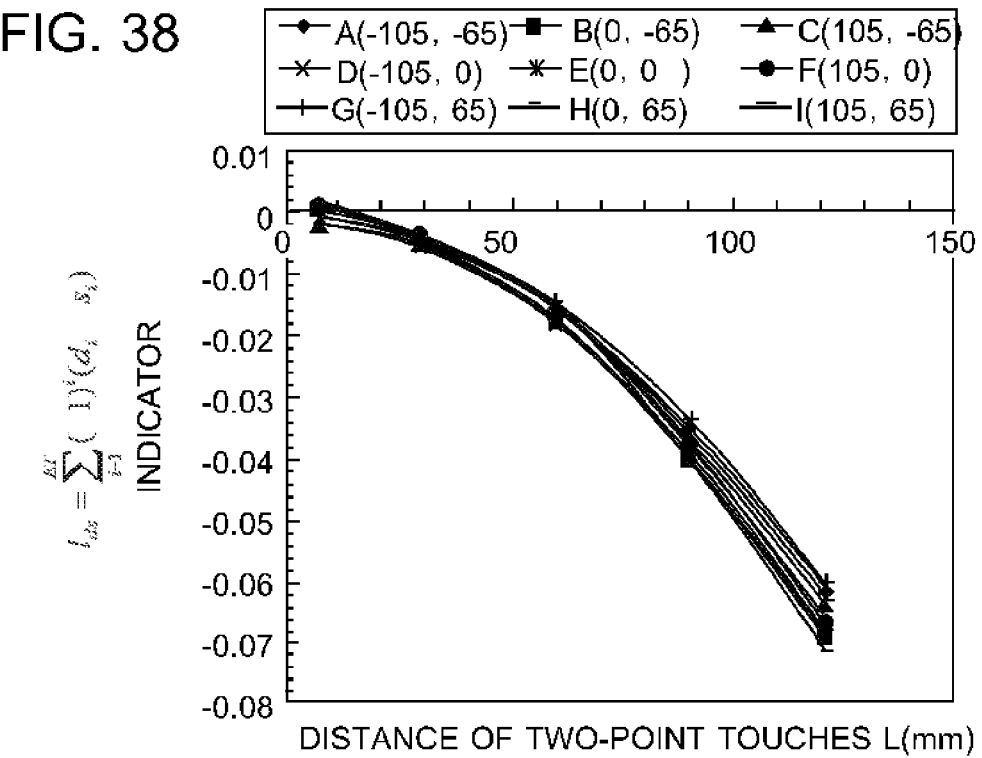
Figure 39:
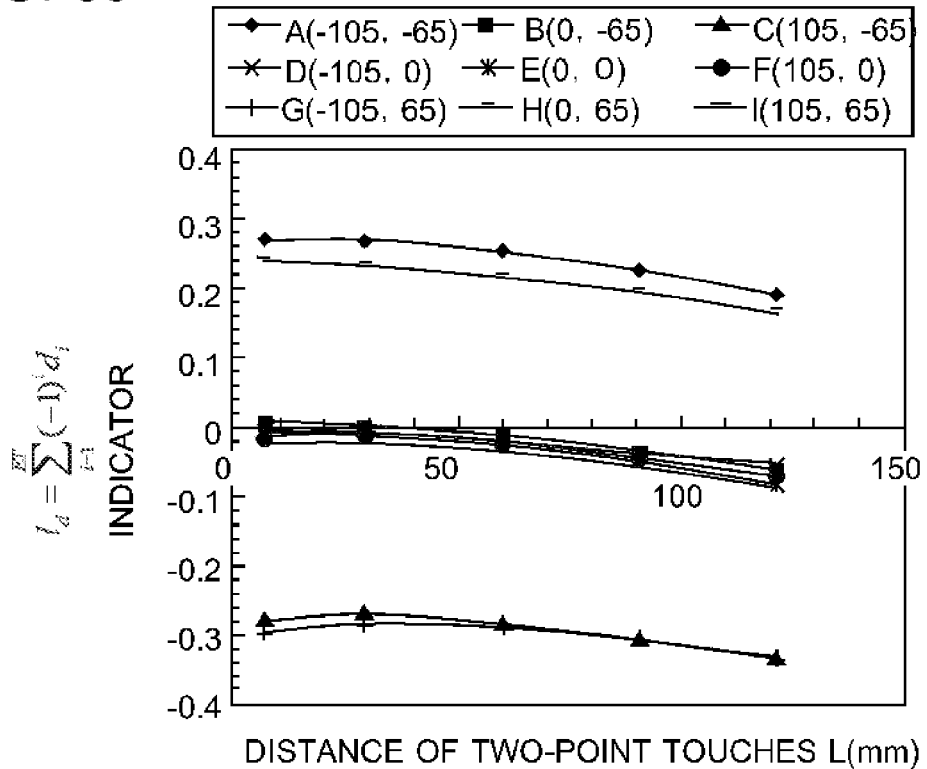
Figure 40:
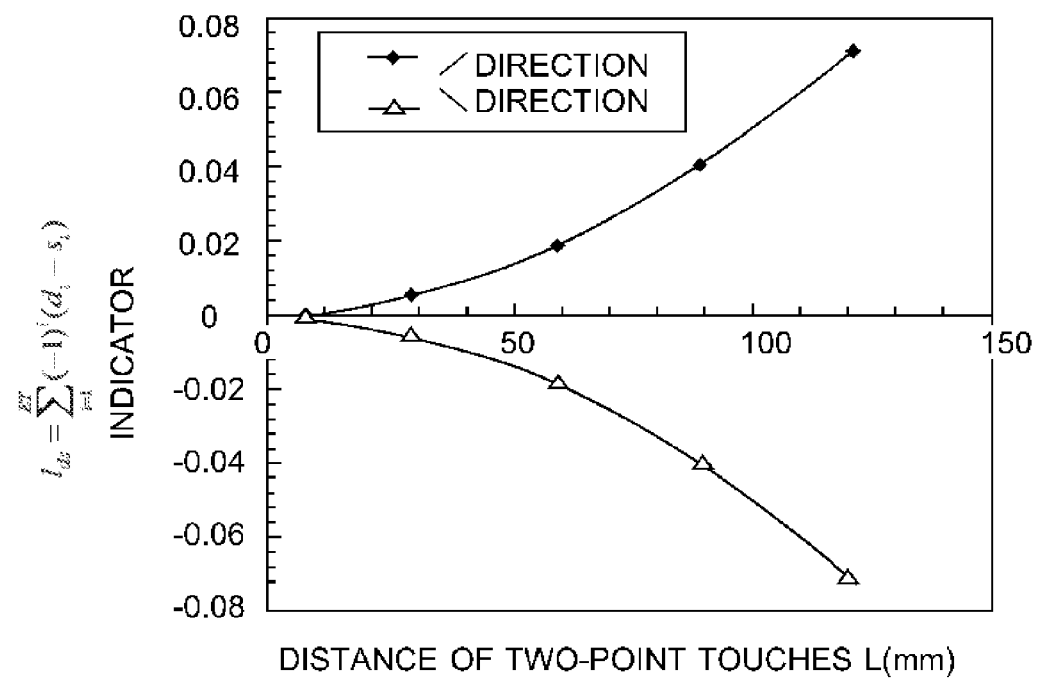

Each of FIGS. 21A and 21B is a plan view for illustrating an arrangement of detection electrodes according to EMBODIMENT 5;

Each of FIGS. 22A and 22B is a relational diagram of detection electrodes and peripheral lines according to EMBODIMENT 5;

FIGS. 23A to 23C are diagrams illustrating the various numbers of detection electrodes according to EMBODIMENT 6;

FIG. 24 is a graph illustrating the total value J of electric currents according to EXAMPLE 1;

FIG. 25 is a graph illustrating current values according to EXAMPLE 1;

FIG. 26 is a graph illustrating position coordinates according to EXAMPLE 1;

FIG. 27 is a graph illustrating second normalized values according to EXAMPLE 1;

FIG. 28 is a graph illustrating first normalized values according to EXAMPLE 1;

FIG. 29 is a graph of the values of "(second normalized value)−(first normalized value)" according to EXAMPLE 1;

FIG. 30 is a graph illustrating an indicator 1 of touch gesture according to EXAMPLE 1;

FIG. 31 is a graph illustrating the detected distance L[iT] between two points on a two-point touch according to EXAMPLE 1;

FIG. 32 is a schematic diagram of an inspection of a touch gesture function according to EXAMPLE 2;

FIG. 33 is a graph illustrating the difference in characteristics depending on the open and close directions of a two-point touch according to EXAMPLE 2;

FIG. 34 is a diagram illustrating an evaluation position, distance change direction, and range (/ direction) in a surface of the display section according to EXAMPLE 3;

FIG. 35 is a graph illustrating the relation (/ direction) between an indicator value $l_{ds}$ and a distance L between two points on a two-point touch according to EXAMPLE 3;

FIG. 36 is a graph illustrating the relation (/ direction) between the indicator value $l_d$ and the distance L between two points on a two-point touch according to EXAMPLE 3;

FIG. 37 is a diagram illustrating an evaluation position, distance change direction, and range (\ direction) in a surface of the display section according to EXAMPLE 3;

FIG. 38 is a graph illustrating the relation (\ direction) between an indicator value $1_{ds}$ and a distance L between two points on a two-point touch according to EXAMPLE 3;

FIG. 39 is a graph illustrating the relation (\ direction) between an indicator value $1_d$ and a distance L between two points on a two-point touch according to EXAMPLE 3; and FIG. 40 is a graph illustrating the relation between the indicator value $1_{ds}$ in the center of the display section and the distance L between two touch points on a two-point touch according to EXAMPLE 3.

DETAILED DESCRIPTION

Illustrative embodiments of touch sensor devices and electronic devices will be described below with reference to the drawings. It will be appreciated by those of ordinary skill in the art that the description given herein with respect to those figures is for exemplary purposes only and is not intended in any way to limit the scope of potential embodiments which may be resolved by referring to the appended claims.

Hereafter, embodiments of the present invention will be described. It should be noted that, in the description below, the following notations are used as vectors: position coordinates p, reference standardized values U[n], reference normalized values S[n], standardized values u, first normalized values d, and second normalized values s. A difference "d−s" between the first normalized value d and the second normalized value s also represents a vector.

Embodiment 1

Figure 1:
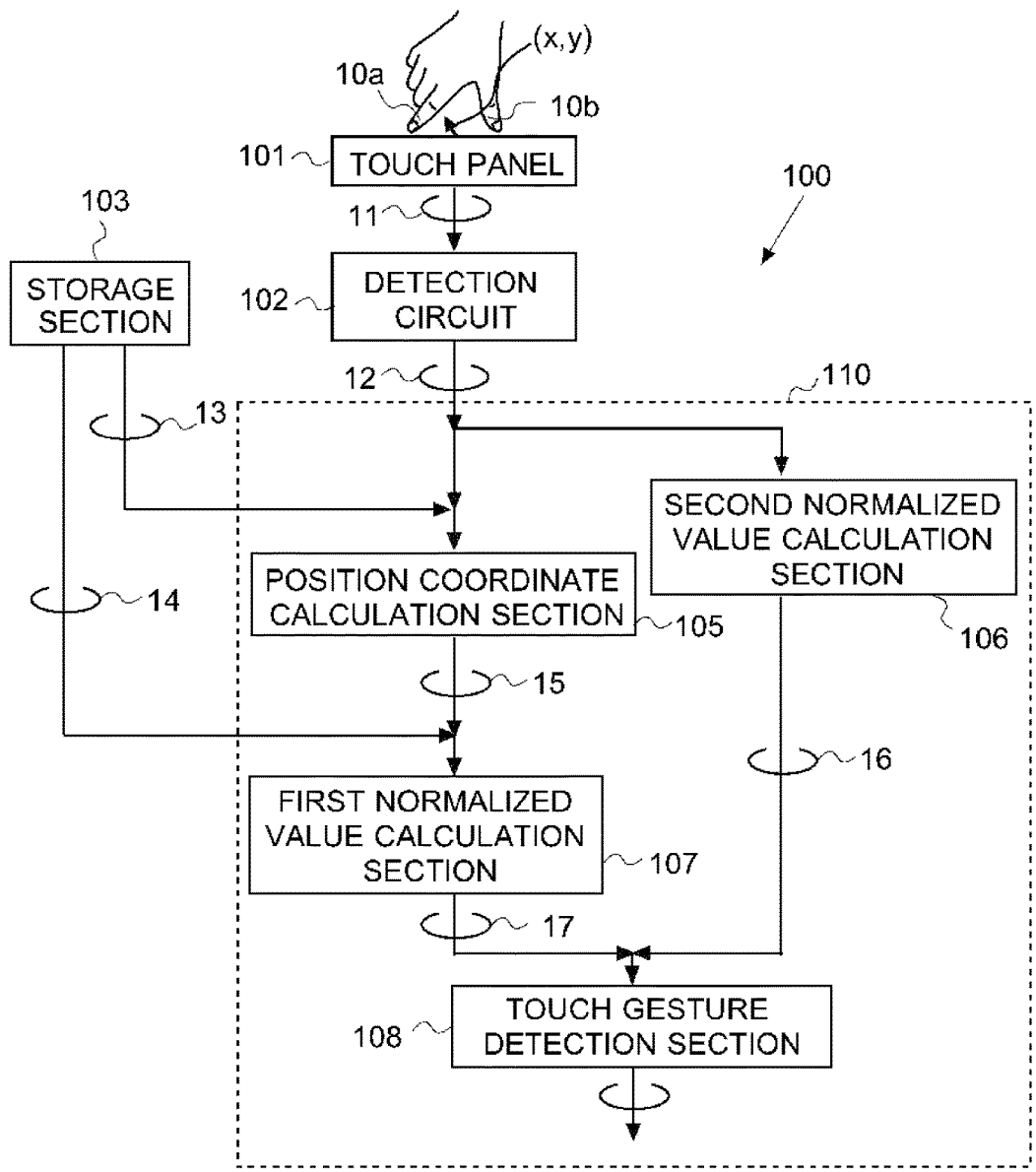
FIG. 1 is a functional block diagram illustrating a touch sensor device according to EMBODIMENT 1.

FIG. 1 is a functional block diagram illustrating a touch sensor device of EMBODIMENT 1. Hereafter, the description will be provided with reference to FIG. 1. The touch sensor device 100 of EMBODIMENT 1 includes: a touch panel 101; a detection circuit 102; a storage section 103; a position coordinate calculation section 105; a second normalized value calculation section 106; a first normalized value calculation section 107; and a touch gesture detection section 108.

The touch panel 101 is configured to change a plurality of electric currents 11 according to the occurrence of a touch with pointers 10a, 10b ("pointer 10" when indicating all of a plurality of pointers) and position coordinates of pointer 10, and output the electric currents. The detection circuit 102 is configured to output a detection signal 12 based on the electric currents 11 outputted from the touch panel 101, for every fixed time. The storage section 103 stores reference standardized values 13 and reference normalized values 14, where the reference standardized values 13 are estimated coordinates obtained by acquiring, in response to plural sets of reference coordinates being pointed sequentially using one pointer, detection signals and standardizing the acquired detection signals, and the reference normalized values 14 are obtained by normalizing electric currents passing the touch panel 101 so as to the total sum of the electric currents to be a constant value. The position coordinate calculation section 105 is configured to calculate the position coordinates 15 using the detection signals 12 and the reference standardized values 13 stored in the storage section 103. The second normalized value calculation section 106 is configured to calculate second normalized values 16 using the detection signals 12 outputted from the detection circuit 102. The first normalized value calculation section 107 is configured to calculate first normalized values 17 using the detection signals 12 outputted from the detection circuit 102, the reference normalized values 14 stored in the storage section 103 and the position coordinates 15 calculated in the position coordinate calculation section 105. The touch gesture detection section 108 is configured to detect a touch gesture 18 based on the first normalized values 17 and the second normalized values 16.

A touch gesture detection program to be used in the touch sensor device 100 of EMBODIMENT 1, when being executed by computing section 110 of the touch sensor device 100, causes the computing section 110 to perform steps of touch gesture detection. This program is usually stored in the storage section 103. This program may be recorded on a non-transitory storage medium, such as a semiconductor memory. In this case, the program is read from a storage medium by the computing section 110 and executed.

The touch gesture detection method and the touch gesture detection program of EMBODIMENT 1 can take substantially the same form as one of various forms of the touch sensor device 100 described above. In addition, the touch gesture detection method and the touch gesture detection program in other embodiments and examples described later can also take substantially the same mode as the mode of a touch sensor device.

Hereafter, EMBODIMENT 1 will be described in detail and specifically.

Figure 2:
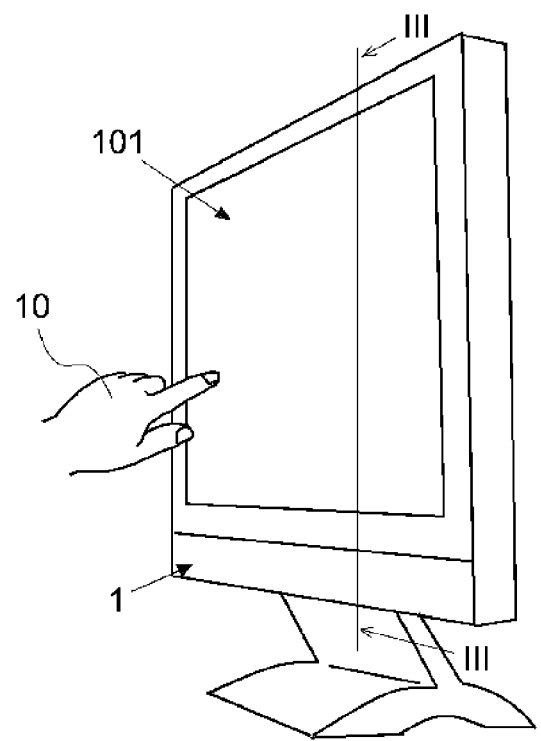
FIG. 2 is a schematic perspective view illustrating an electronic device according to EMBODIMENT 1.
Figure 3:
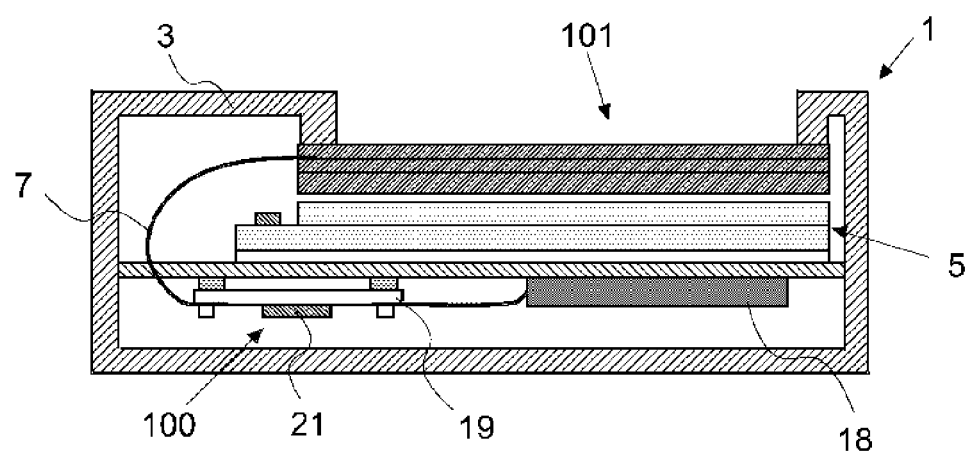
FIG. 3 is a schematic cross-sectional view taken along the III-III line in FIG. 2.
Figure 4:
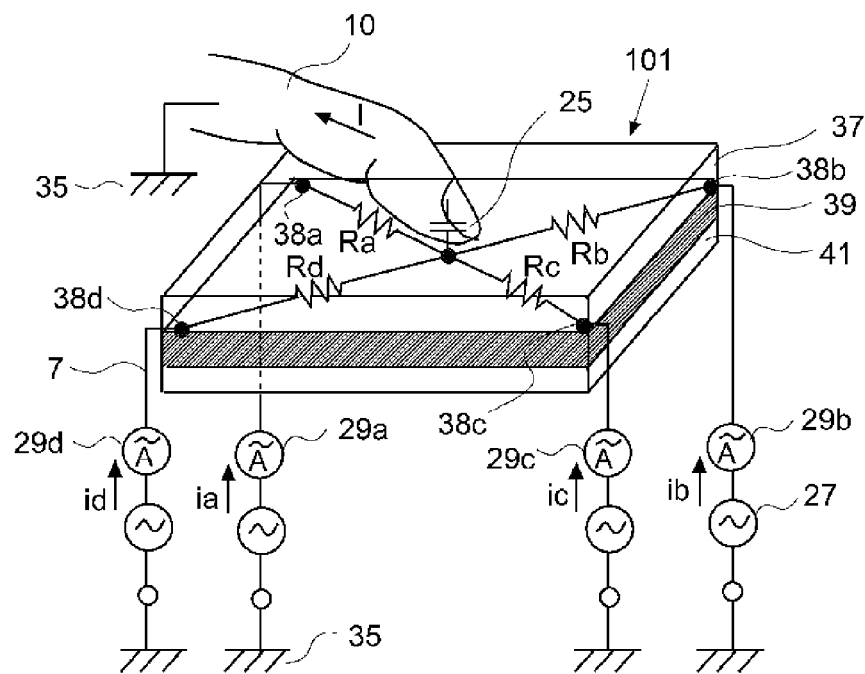
FIG. 4 is an equivalent circuit diagram of a touch sensor function in the electronic device according to EMBODIMENT 1.
Figure 5:
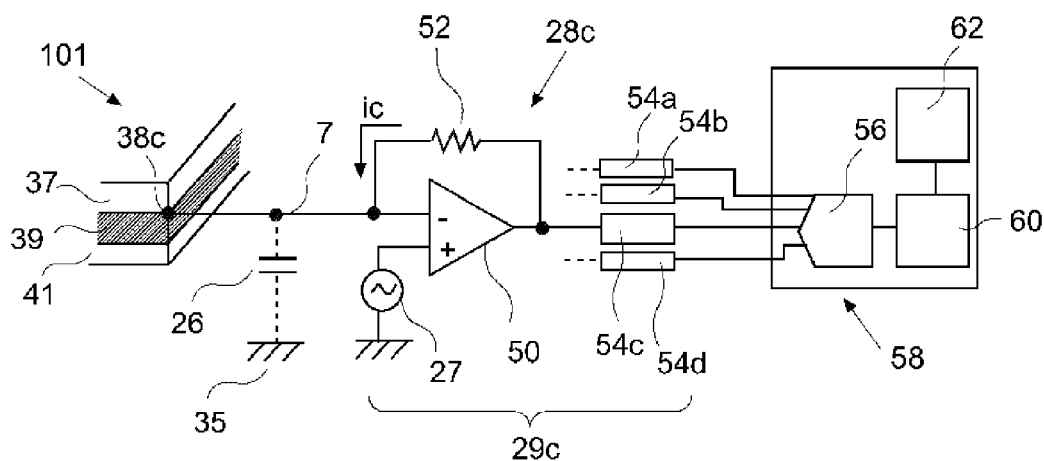
FIG. 5 is a schematic block diagram of a current detection circuit according to EMBODIMENT 1 and peripheral functions thereof.

The touch sensor device and the electronic device of EMBODIMENT 1 are described. Hereinafter, the electronic device of EMBODIMENT 1 will be described using a monitor as an example. FIG. 2 is a schematic perspective view of the electronic device of EMBODIMENT 1. FIG. 3 is a schematic cross-sectional view of the electronic device of EMBODIMENT 1 taken along the III-III line in FIG. 2. FIG. 4 is an equivalent circuit diagram of a touch sensor function in the electronic device of EMBODIMENT 1. FIG. 5 is a schematic block diagram of a current detection circuit and its peripheral functions.

In the schematic cross-sectional view illustrated in FIG. 3, the electronic device 1 of EMBODIMENT 1 includes a touch sensor device 100 of EMBODIMENT 1. The touch sensor device 100 includes a touch panel 101, an FPC 7, a power unit 18, a main substrate 19, and a controller 21.

In the equivalent circuit diagram of the touch sensor function in FIG. 4, the touch panel 101 includes on the transparent insulating substrate 41: an impedance surface 39, such as a transparent conductive layer; a plurality of detection electrodes 38a to 38d arranged at the four corners of the impedance surface 39 ("detection electrode 38" when indicating to all of a plurality of detection electrodes); a protective layer 37 that covers the surface of the impedance surface 39. The AC voltage outputted by the oscillator 27, which is an AC voltage source, is applied to the impedance surface 39 via the plural detection electrodes 38a to 38d. When the pointer 10 touches or approaches the surface of the touch panel 101, an electrostatic capacity 25 is formed between the pointer 10 and the impedance surface 39. The current detection section of the touch panel 101 has a plurality of current detection circuits 29a to 29d each configured to detect electric currents flowing into corresponding one of the plural detection electrodes 38. The total sum of electric currents flowing into the plural detection electrodes 38a to 38d is proportional to the electrostatic capacity 25 formed between the pointer 10 and the impedance surface 39. Respective outputs of the plurality of current detection circuits 29a to 29d are converted into discontinuous numerical values (digital signal) by sampling and quantization. A signal proportional to the electrostatic capacity 25 (this is called "detection signal") is calculated based on the numerical values. The detection signal is outputted on a fixed frequency in a range of 30 to 120 Hz. The impedance surface 39 described in EMBODIMENT 1 can be a three-dimensional structure that includes a transparent conductive layer which is not patterned in an area corresponding to the display section. Hereafter, the impedance surface 39 is referred to as a transparent conductive layer 39. In addition, a plurality of current detection circuits 29a to 29d are collectively referred to as a current detection circuit 29.

In the schematic cross-sectional view of the electronic device 1 illustrated in FIG. 3, the touch panel 101 is supported by the top surface of the outer circumference of the touch panel 101 and the inside of the case 3 of the electronic device 1 being adhered on with each other. Here, the case 3 may be formed of plastics, for example. Under the touch panel 101, an LCD 5 is provided as a display section. Although there is a space between the touch panel 101 and the LCD 5 in FIG. 3, the touch panel 101 and the LCD 5 may be adhered together by, for example, a lamination process, using an adhesive film put between the touch panel 101 and the LCD 5. In this case, there is no air layer between the touch panel 101 and the LCD 5, and thus transmittance of light traveling from the LCD 5 to the touch panel 101 can be improved advantageously. Since the LCD 5 is small in thickness and weight as compared to other display devices, such as a CRT (cathode ray tube), it is suitable to be mounted in the electronic device 1. Although the present embodiment uses a transmission LCD as an example, it may be a reflection LCD which uses surrounding light for display. Alternatively, it may be a half-transmissive LCD that supports both transmission and reflection.

A transparent conductive layer 39 formed on the transparent insulating substrate 41 (FIG. 4) with, for example, a sputtering technique, may be used for the touch panel 101. Here, material of the transparent conductive layer 39 may be ITO (Indium Tin Oxide), for example. Thickness of the transparent conductive layer 39 may be 10 nm to 300 nm, and its sheet resistance may be 100Ω/□ (ohms per square) to 1000Ω/□. A terminal portion (detection electrode 38) of the FPC 7 (FIG. 3) is connected to each of the four corners of the transparent conductive layer 39 via conductive adhesive material such as an anisotropic conductive film (ACF). Alternatively, electrodes formed by metal may be formed on four corners of the transparent conductive layer 39. It is desirable if metal in this case has contact resistance lower than ITO, such as silver and titanium. In addition, lines formed of metal are formed to arrange the lines in the outer circumference of the transparent conductive layer 39. In this case, in order to insulate the lines and ITO, ITO under the lines is patterned or an insulating layer is put between the lines and ITO.

Further, a protective layer 37 (FIG. 4) which covers the transparent conductive layer 39 is formed. For example, glass, plastics, and resin, may be used for the protective layer 37. Here, the thickness of the protective layer 37 is preferably 2.0 mm or less. The protective layer 37 may be omitted such that the transparent conductive layer 39 is exposed on the surface. Further, since the electrostatic capacity 25 formed between the pointer 10 touching now and the transparent conductive layer 39 increases as the thickness of the protective layer 37 is thinner, it is possible to increase the signal to noise ratio (S/N) of the touch sensor function. Meanwhile, it is possible to improve durability against repetition input by the pointer 10 more as the thickness of the protective layer 37 is thicker.

Since the touch panel 101 and the main substrate 19 are spaced apart in the embodiment shown in FIG. 3, the FPC 7 is formed as lines that transmit electric signals. Here, since there are portions where the wiring and the substrate are bent for spatial restriction, it is desirable to use the FPC 7. The FPC 7 is generally a printed circuit board that has flexibility and can be deformed largely and has a structure in which an adhesive layer is formed on a transparent insulating substrate in a film form whose thickness is 12 μm to 50 μm and a conductive foil is formed thereon. Portions other than the terminal portion or solder portion of FPC 7 are covered with insulator so as to be protected.

Another terminal portion of the FPC 7 that has been drawn from the transparent conductive layer 39 via the detection electrodes 38 is connected to the input side of the controller 21 for the touch panel 101 via a connector on the main substrate 19. The main substrate 19 is connected to an LCD module constituted by, for example, a liquid crystal panel and a backlight via a connector (not illustrated). The power unit 18 is connected to the main substrate 19 without using a connector. For example, the power unit 18 and the main substrates 19 can be connected together by lines with positive supply voltage +3V to +15V, negative supply voltage −15V to −3V and the reference voltage 0V.

The main substrate 19 is constituted by a surface mount board, and mounts: an IC chip including a microcontroller 58 in a form illustrated in FIG. 5 and flash memory; an interface IC for the display; a power control IC; a controller 21 for the touch panel 101; and a chip having main functions of an oscillating circuit IC. Alternatively, a main substrate 19 may be mounted on a thin printed-circuit board that has a controller 21 on, for example, the FPC 7.

In the embodiment illustrated in FIG. 4, four current detection circuits 29a to 29d are electrically connected to the four corners of the transparent conductive layer 39 via the detection electrodes 38a to 38d, respectively. In addition, the output terminal (oscillator 27) of the oscillating circuit IC is electrically connected to the four corners of the transparent conductive layer 39 via the current detection circuits 29. Here, sine wave voltage may be used for AC voltage, and for example, its amplitude can be at 0.5V to 2V and its frequency can be set at 20 kHz to 200 kHz.

In the schematic block diagram illustrated in FIG. 5, the current detection circuit 29c includes: a current-voltage conversion circuit 28c, which is a preceding part; and an AC-DC conversion circuit 54c, which is a following part. The output terminal of the AC-DC conversion circuit 54c is input to the analog-to-digital conversion circuit 56 included in the microcontroller 58. Here, the analog-to-digital conversion circuit 56 supports a multichannel input, and four outputs of the AC-DC conversion circuits 54a to 54d are input to the analog-to-digital conversion circuit 56.

A CPU (central processing unit) 60 is a main processor in the microcontroller 58 and is connected to an analog-to-digital conversion circuit 56 and a flash memory 62, for example. Stored in a flash memory 62 are a touch gesture detection program and a measurement program of EMBODIMENT 1 of the touch panel 101. A nonvolatile memory, which can retain data even if the power is turned off, such as a flash memory 62, is used to store the programs.

The oscillator 27 and the current detection circuits 29 (29a to 29d) are an example of the detection circuit 102 in FIG. 1. The microcontroller 58 is an example of the computer 110 in FIG. 1. The pointer (finger) 10 is an example of the pointer 10 in FIG. 1.

Next, operations of the electronic device 1 including the touch panel 101 will be described in detail with reference to the embodiment illustrated in FIG. 4.

Sine wave voltage is applied to the transparent conductive layer 39 from the oscillator 27, and the transparent conductive layer 39 is maintained at uniform voltage. When the pointer 10 touches the surface of the protective layer 37, an electrostatic capacity 25 of, for example, 5 pF to 50 pF, is formed between the pointer 10 and the transparent conductive layer 39 via the protective layer 37. Since the human body includes a large amount of water and has electrical conductivity, when the pointer 10 is a fingertip, an electrostatic capacity 25 formed by the touch of the pointer 10 is connected to the electric potential of the human body. Further, since a human body has a grounding effect, an end of the electrostatic capacity 25 is grounded. When the frequency of the sine wave voltage outputted from the oscillator 27 is 100 kHz, impedance of a human body is several kilo-ohms. Meanwhile, when the electrostatic capacity 25 is 5 pF to 50 pF, impedance of the electrostatic capacity 25 is 30 kΩ to 300 kΩ. Accordingly, since the impedance of the electrostatic capacity 25 is higher than the impedance of a human body by a single figure to about double figures, influence of the impedance of a human body is disregarded.

The electric current created in response to the touch is separated into electric currents to flow into the current detection circuits 29a to 29d as electric currents ia-id via the transparent conductive layer 39, respectively. The electric currents ia to id are electric currents detected by the current detection circuits 29a to 29d of the embodiment illustrated in FIG. 4. That is, the electric currents ia, ib, ic, and id are electric currents detected by the current detection circuit 29a, the current detection circuit 29b, the current detection circuit 29c, and the current detection circuit 29d, respectively. The ratio of electric currents ia to id changes according to resistances Ra to Rd of the transparent conductive layer 39, and the resistances Ra to Rd changes according to the position of the pointer 10 that has touched the touch panel 101. An example of calculation related to the touch position can be expressed as Ex. 1 and 2.

$$x = k1 + k2 \times (ib+ic)/(ia+ib+ic+id) \tag{Ex. 1}$$

$$y = k3 + k4 \times (ia+ib)/(ia+ib+ic+id) \tag{Ex. 2}$$

Here, x and y are x-coordinate and y coordinate of the touch position, and k1 to k4 are constants. The constants k1 to k4 are obtained by calibration to be described below. A user touches at a reference coordinates on the touch panel 101, and electric currents ia to id is measured on the touch. If x, y and ia to id are substituted into Ex. 1 and Ex. 2, relational expressions of the constants k1 to k4 are obtained. Specifically, if the number of measurement points is two, constants k1 to k4 are obtained. In addition, when the number of measurement points is more than two, the constants k1 to k4 are obtained using a least squares technique. As the number of measurement points increases, influence of the error of measurement is reduced, and thus it is possible to improve accuracy in calculating the constants k1 to k4. Here, electric currents is to id are proportional to the four detection signals, which are described later, acquired with the microcontroller 58.

Figure 6:
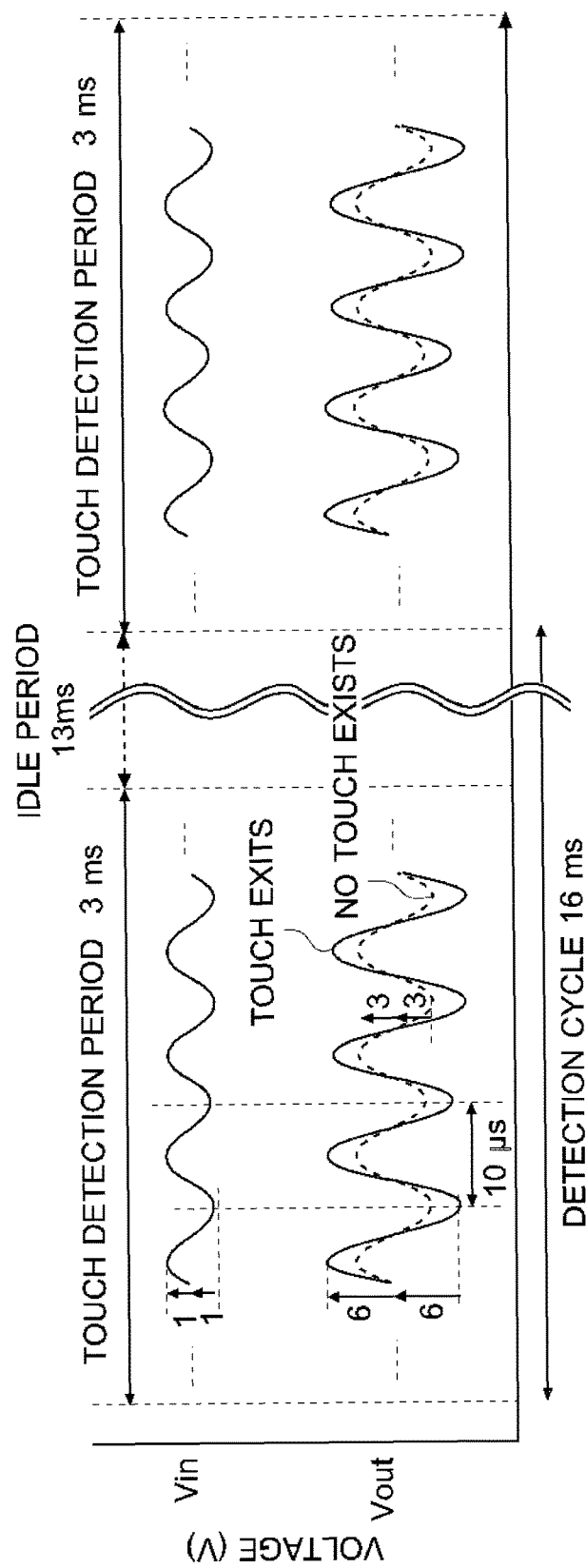
FIG. 6 is a graph showing an example of voltage waveform in the touch sensor device according to EMBODIMENT 1.

FIG. 6 illustrates an example of a voltage waveform in the touch sensor device 100. In the example illustrated in FIG. 6, the touch detection period is 3 milliseconds, the cycle of the touch detection period is 16 milliseconds. That is, since the touch detection period is 3 milliseconds, an idle period that does not detect the touch is the remaining 13 milliseconds.

In the example illustrated in FIG. 6, $v_{in}$ is an output waveform of the oscillator 27, and $v_{out}$ is an output waveform of the current-voltage conversion circuit 28 included in the current detection circuit 29. Here, the frequency of $v_{in}$ is 100 kHz, and the amplitude is 1V. At this time, if there is no touch, the amplitude of $v_{out}$ is 3V, and if there is a touch, the amplitude of $v_{out}$ is set to 6V, for example. That is, the amplitude increases by 3V with the touch. Here, the amplitude 3V of $v_{out}$ that is caused in the case when there is no touch comes from the presence of the capacity other than a human body when viewed from the transparent conductive layer 39, that is, the presence of a stray capacity, and from $v_{in}$ being outputted to $v_{out}$ of the current-voltage conversion circuit 28. Thus, even if there is no approach of a pointer 10 or a human body, such as a palm, a certain amount of voltage is produced in the output of the analog-to-digital conversion circuit 56 in practice.

In the embodiment illustrated in FIG. 5, the output of the current-voltage conversion circuit 28c is AC voltage, and thus the AC voltage is converted into direct current voltage in an AC-DC conversion circuit 54c as the succeeding element. Further, since the DC voltage output of the AC-DC conversion circuit 54c and other AC-DC conversion circuits 54a, 54b and 54d are analog signals, the analog signals are converted into digital signals by the analog-to-digital conversion circuit 56 as the succeeding element. Next, calculation processing is carried out by the CPU 60 using the digital signals thus converted. As a result of such signal processing conducted by elements from the current detection circuits 29 to the CPU 60, during one period when the touch is determined, each of the electric currents is to id flowing into the current detection circuit 29 is converted into numerical values (detection signals) proportional to the magnitude of the electric current.

The CPU 60 is configured to execute calculation related to sensing of the occurrence of a touch and the touch position using the detection signals, and function as a position coordinate calculation section 105, a second normalized value calculation section 106, a first normalized value calculation section 107, and a touch gesture detection section 108. After the power of the electronic device 1 is switched ON, programs (including a touch gesture detection program and a measurement program of EMBODIMENT 1) are read from the flash memory 62 by the CPU 60, and operations by the microcontrollers 58 are performed repeatedly. An OS (operating system) is stored in the flash memory 62. When this is read, the CPU 60 issues directions of, for example, a mouse event, via the OS. For example, a mouse event is a motion of a mouse (mouse cursor) based on the detection position calculated after the touch, a mouse click-down and a mouse click-up as a result of a tapping operation. In this way, the microcontroller 58 performs processing from analog-to-digital conversion to a mouse event automatically at a predetermined frequency of 60 Hz.

Next, the presence of a stray capacity (or parasitic capacitance) in the viewpoint of the transparent conductive layer 39 will be described with reference to the embodiment illustrated in FIG. 5. The current-voltage conversion circuit 28c is constituted by the operational amplifier 50 and the resistance element 52, where an inversed input terminal of the operational amplifier 50 and the transparent electrically-conductive layer 39 are electrically connected. Although the inversed input terminal of the operational amplifier 50 and the transparent electrically-conductive layer 39 are connected via lines of, for example, the FPC 7, parasitic capacitance 26 is formed between the lines and the ground 35. Since the electric current flows into the ground 35 via the parasitic capacitance 26 from the FPC 7, the electric current flowing into the current-voltage conversion circuit 28c includes the electric current accompanied with the parasitic capacitance 26.

Since the electric current flowing into the current-voltage conversion circuit 28c is proportional to the detection signal handled by the CPU 60, the detection signal includes signals accompanied with the parasitic capacitance 26. The signals accompanied with the parasitic capacitance 26 are unrelated to the touched position coordinates, which causes a problem that the position shifts when the detection signals are used to obtain the detection position as is. As a countermeasure, baseline compensation is performed by holding the signal accompanied with the parasitic capacitance 26 as a baseline and subtracting from the newly acquired detection signal.

Figure 7:
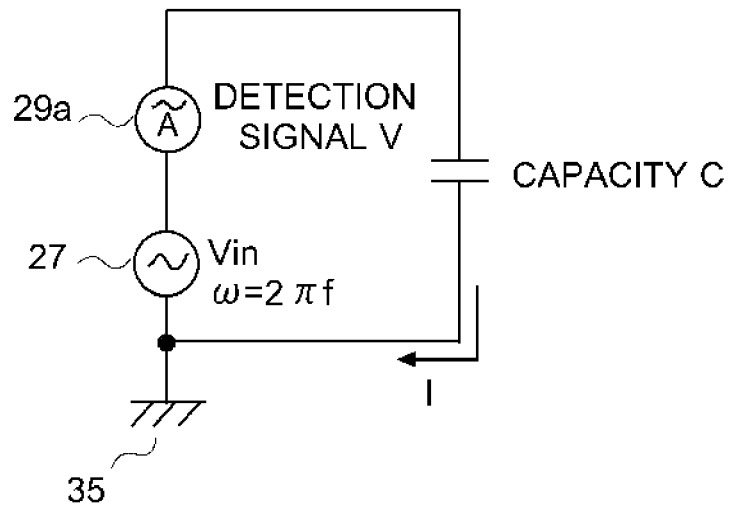
FIG. 7 is a measurement circuit diagram that obtains the relation of the electrostatic capacity C and the detection signal according to EMBODIMENT 1.
Figure 8:
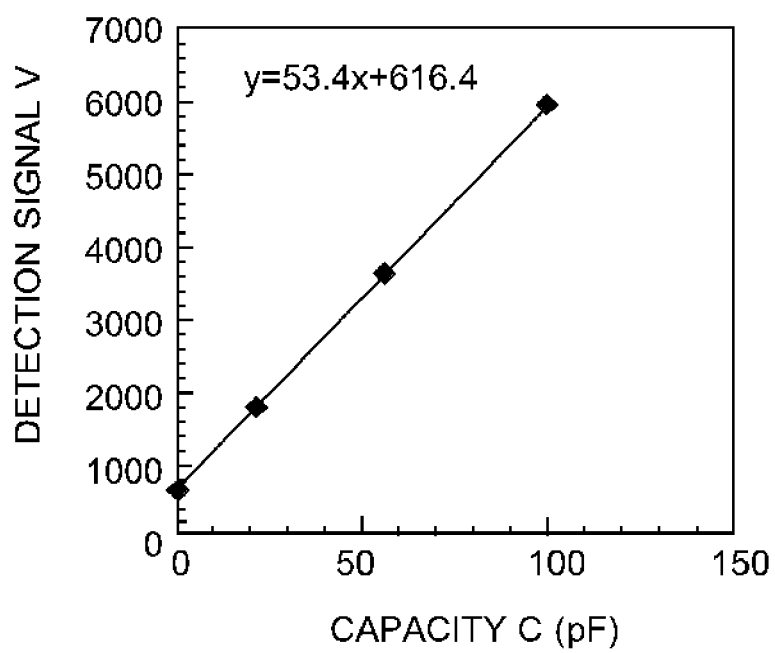
FIG. 8 is a diagram illustrating the relation of the electrostatic capacity C and the detection signal V according to EMBODIMENT 1.

Relation between a Detection Signal and an Electric Current:

Next, the relation between a detection signal and an electric current according to EMBODIMENT 1 will be described. Specifically, the detection signal handled by the CPU 60 is converted into an electric current passing in the transparent conductive film 39. FIG. 7 illustrates the measurement circuit of the conversion. FIG. 8 illustrates the measurement result.

First, as compared to the embodiment illustrated in FIG. 4, the electrostatic capacity 25 formed between the transparent conductive layer 39 and the pointer 10 is replaced with a capacitor of capacity C in the measurement circuit in FIG. 7. Next, the transparent conductive layer 39 is connected to the current detection circuit 29 via the detection electrode 38, where the current detection circuit 29a maintains the connection as is, and other current detection circuits 29b to 29d are unconnected to the transparent conductive layer 39. The detection signal that is an output of the current detection circuit 29a is referred to as a detection signal V, and the electric current passing in the detection electrode 38a is referred to as i. The detection signal V is measured while changing the capacity C of the capacitor. As can be seen from the measurement result illustrated in FIG. 8, the capacity C and the detection signal V are in a proportional relation, and are shown with the following Ex. 3.

$$V=K5 \times C+K6 \quad (\text{Ex. 3})$$

Here, K5 and K6 are, for example, calculated by a least squares technique using a plurality of measurement data. It should be noted that, according to the measurement result shown in FIG. 8, K5=53.4 and K6=616.4. Here, K5 is a value that changes according to, for example, circuit constants of the current detection circuit 29a. It should be noted that, when C in Ex. 3 is C=0, V=K6. Accordingly, it can be understood that K6 indicates the influence of parasitic (floating) capacity.

When AC voltage $v_{in}$ is applied to the capacity C, the relation of the AC current i flowing in the capacity C is shown with Ex. 4.

$$I=j \times \omega \times C \times v_{in} \quad (\text{Ex. 4})$$

Here, j is an imaginary number, $\omega$ is an angular frequency ($\omega=2\pi \times f$), $v_{in}$ corresponds to an output of an AC voltage source in the measurement circuit in FIG. 7, and f indicates a frequency of the output waveform of the AC voltage source. If the amplitude of current i is I, and the amplitude of output $v_{in}$ of the AC voltage source is $V_{in}$, I is expressed as Ex. 5.

$$I=\omega \times C \times V_{in} \quad (\text{Ex. 5})$$

If C in Ex. 4 and Ex. 5 is cancelled, the following Ex. 6 can be obtained.

$$V=K5/\omega/V_{in} \times I+K6 \quad (\text{Ex. 6})$$

Here, $V_{on}$ is assigned to the detection signal V at the time when the pointer object contacts on the surface of the touch panel, and $I_{on}$ is assigned to I in Ex. 6, which gives the following Ex. 7.

$$V_{on}=K5/\omega/V_{in} \times I_{on}+K6 \quad (\text{Ex. 7})$$

Similarly, $V_{off}$ and $I_{off}$ are assigned to the detection signal V at the time when the pointer is sufficiently distant from the surface of the touch panel and I in Ex. 6, respectively, which gives the following Ex. 8.

$$V_{off}=K5/\omega/V_{in} \times I_{off}+K6 \quad (\text{Ex. 8})$$

Next, by calculating (Ex. 7-Ex. 8), the following Ex. 9 can be obtained.

$$V_{on}-V_{off}=K5/\omega/V_{in} \times (I_{on}-I_{off}) \quad (\text{Ex. 9})$$

In Ex. 9, K6 indicating the influence of parasitic capacitance is eliminated. Here, ($V_{on}-V_{off}$) at the left side in Ex. 9 indicates a change in the detection signal V accompanied with the touch, and ($I_{on}-I_{off}$) at the right side indicates a change in the detection current I accompanied with the touch. Thus, by using Ex. 9, the change in the detection signal can be converted into the change in the detection current. Here, Ex. 9 has been derived using the current detection circuit 29a as an example. However, for the current detection circuits 29b to 29d, the same expression as Ex. 9 can be derived, too.

From the above, it can be understood that the change in the detection signal can be converted to change in electric current. Thus, in the following description of the algorithm, changes in the four detection signals are expressed as electric currents $J_1$ to $J_4$. Accordingly, electric currents $J_1$ to $J_4$ show values from which the influence of parasitic capacitance have been removed.

Figure 9:
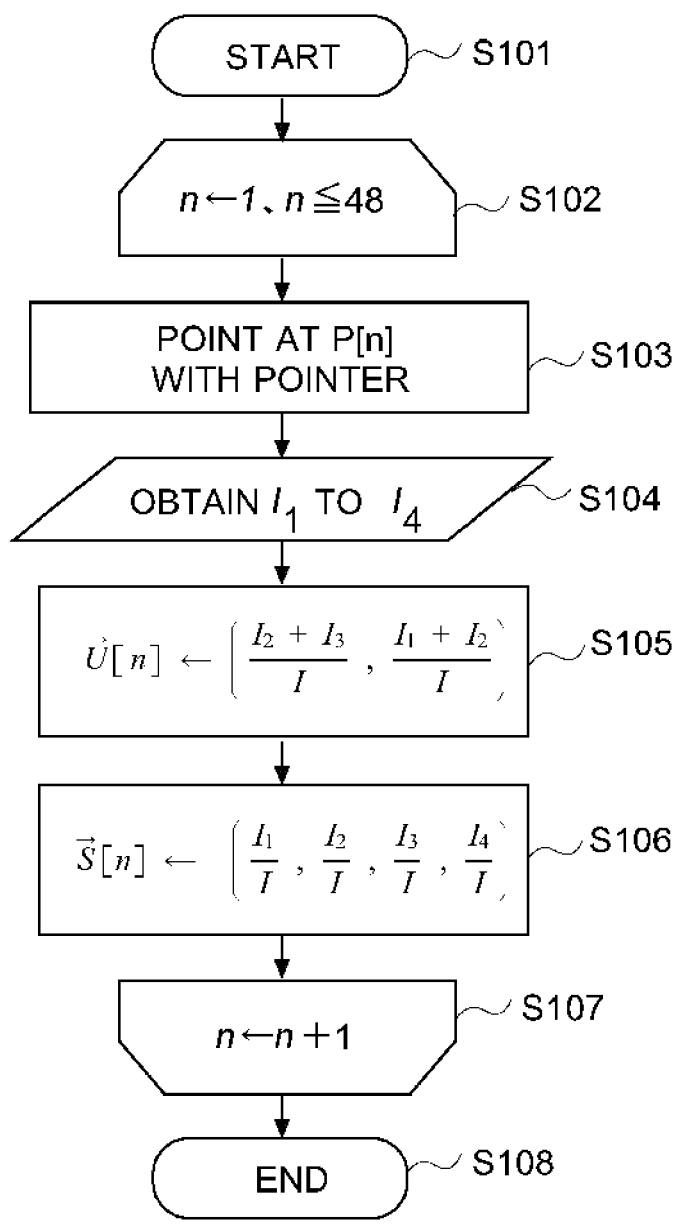
FIG. 9 is a flowchart illustrating processes for calculating a reference standardized value and a reference normalized value.
Figure 11:
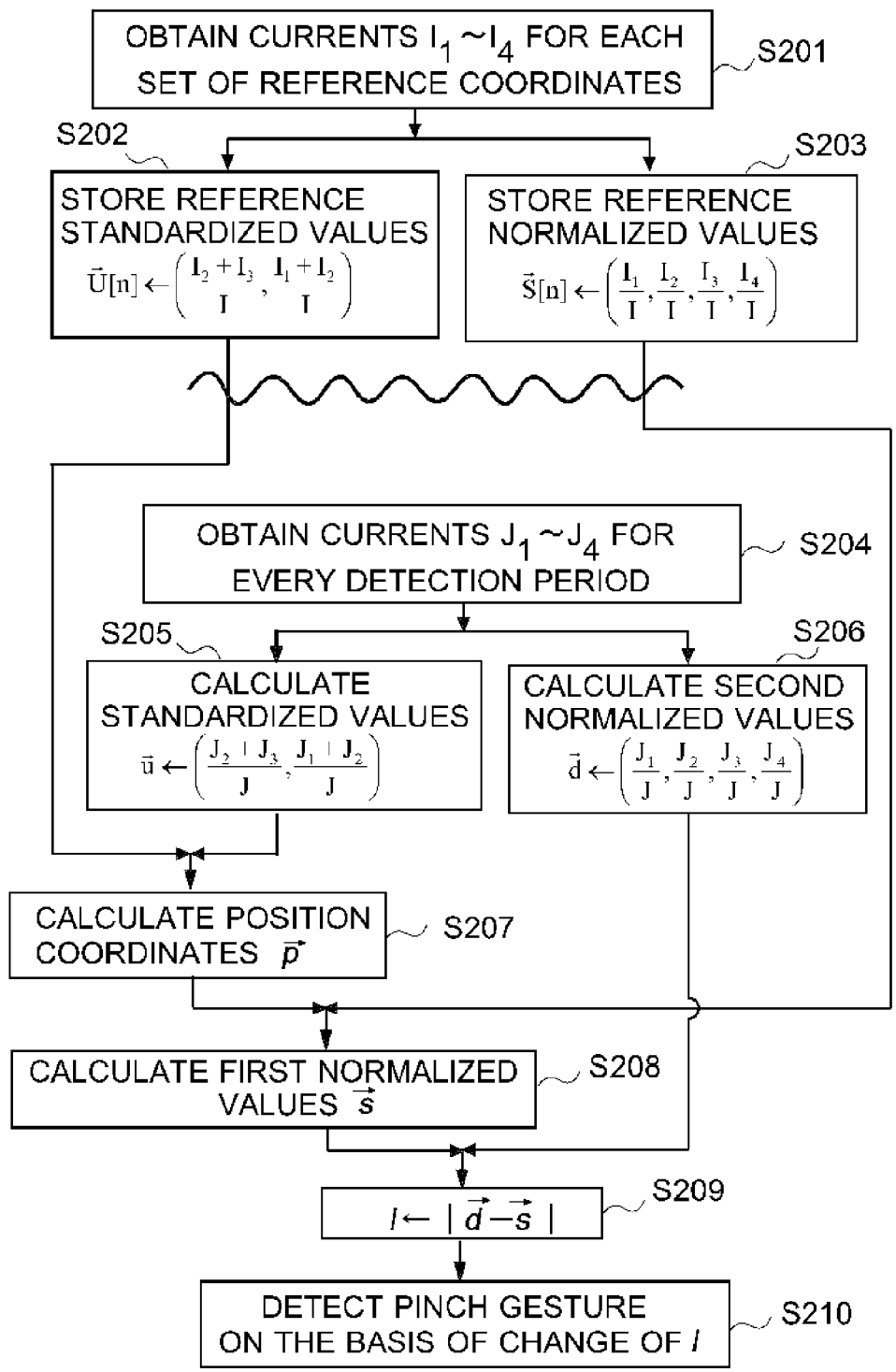
FIG. 11 is a functional block diagram illustrating a program according to EMBODIMENT 1.

Current Measurement when Reference Coordinates have been Touched with One Pointer:

Next, operations and a control method of the touch sensor device 100 and a program for operating the touch sensor device 100 will be described as an example of the touch gesture detection according to EMBODIMENT 1. FIG. 9 and FIG. 11 are a flowchart and a functional block diagram for illustrating operations and a control method of the touch sensor device, and a program for operating the touch sensor device according to EMBODIMENT 1.

Figure 10A:
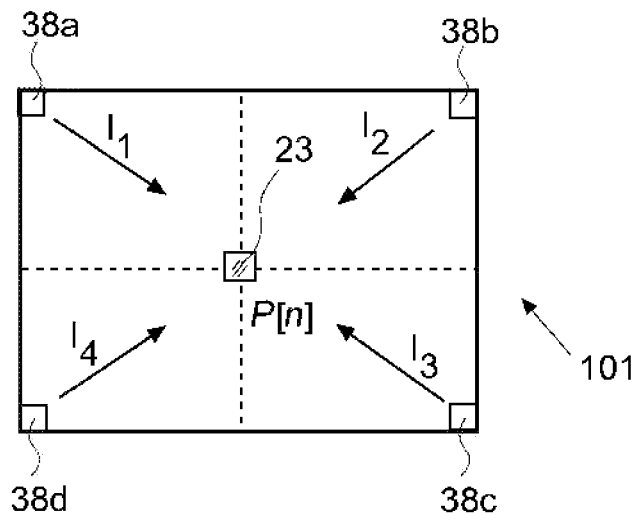
FIGS. 10A and 10B are a schematic diagram and graph illustrating the processes of the flowchart of FIG. 9.
Figure 10B:
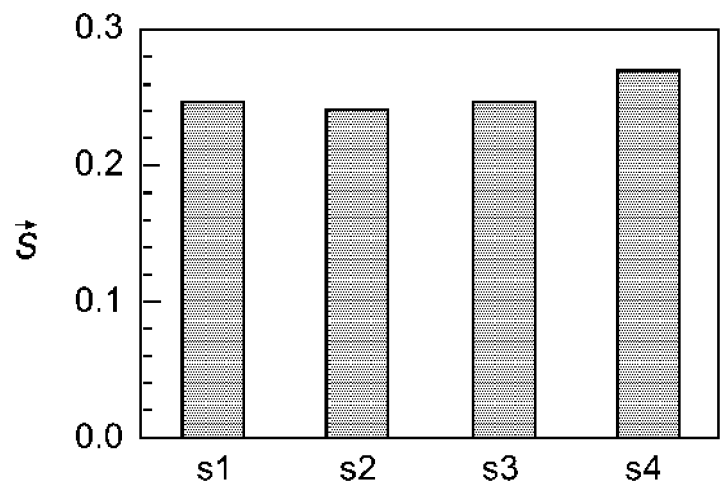

FIG. 9 is a flowchart illustrating processes of obtaining reference standardized values U[n] and reference normalized values S[n] by measuring them with one inspection pointer 23 in advance. The inspection pointer object 23 is made of metal. Specifically, a brass square stick electrically connected to the reference potential (GND) is used. FIGS. 10A and 10B are schematic diagrams for illustrating the flowchart in FIG. 9. In the schematic diagrams in FIGS. 10A and 10B, electric currents flowing into a plurality of detection electrodes 38a to 38d are denoted as $I_1$ to $I_4$. Each step of the program will be described with reference to the embodiment illustrated in FIGS. 9, 10A and 10B.

(S101) The measurement program is started.

(S102) Reference coordinates at 48 locations arranged at equal intervals in the display section are given as 2-element vectors P[n]=(X[n], Y[n]). The initial value of n is 1.

(S103) One inspection pointer 23 points at the reference coordinate P[n].

(S104) Electric currents $I_1$ to $I_4$ flowing into the four corners of the transparent conductive layer 39 constituting the touch panel 101 are measured. Here, $I_1$ to $I_4$ are values that have undergone baseline compensation which removes electric currents accompanied with stray capacity.

(S105) Electric currents $I_1$ to $I_4$ are standardized to calculate the following standardized values:

$$\frac{I_2+I_3}{I}, \frac{I_1+I_2}{I}, \text{ where } I = \sum_{i=1}^{4} I_i.$$

The standardized values are assigned to 2-element vector $U[n]=(U_1[n], U_2[n])$, and is stored in the storage section 103. Here, the standardized values measured at the reference coordinate P[n] are reference standardized values U[n].

(S106) Electric currents $I_1$ to $I_4$ are normalized such that the total sum of electric currents passing the impedance surface is a constant value (here, the total sum is 1). Then, the following normalized values are calculated:

$$\frac{I_1}{I}, \frac{I_2}{I}, \frac{I_3}{I}, \frac{I_4}{I}, \text{ where } I = \sum_{i=1}^{4} I_i.$$

The normalized values are assigned to 4-element vector $S[n]=(S_1[n], S_2[n], S_3[n], S_4[n])$ to be stored in the storage section 103. Here, the normalized values measured at the reference coordinates P[n] are assumed as reference normalized values S[n].

(S107) Next, the value of n is incremented, and S103 to S106 are repeated for the number of reference coordinates P[n], which is 48.

(S108) The measurement program ends.

As described above, plural sets of reference coordinates are set in the active area which is an area where a touch input is enabled. Then, the electric currents are measured for every set of reference coordinates in a state where one inspection pointer 23 touches or approaches the surface of the touch panel 101 to calculate the estimated coordinates using the detected electric currents. Here, the estimated coordinates are referred to as standardized values, and the operation for calculating the standardized values is referred to as standardization. Further, values of the detected electric currents are normalized so as to make the total sum of electric currents passing the transparent conductive layer (impedance surface) a constant value, to obtain normalized values. The standardized values corresponding to the reference coordinates are stored as reference standardized values, and the normalized values corresponding to the reference coordinates are stored as reference normalized values. It should be noted that, in Step S105, electric currents $I_1$ to $I_4$ are standardized to have standardized values of $$\frac{I_2+I_3}{I}, \frac{I_1+I_2}{I}$$

or alternatively, standardized values of $$\frac{I_3}{I_1+I_3} + \frac{I_2}{I_2+I_4}, \frac{I_1}{I_1+I_3} + \frac{I_2}{I_2+I_4}.$$

Functional Blocks of the Program and the Method:

FIG. 11 is a functional block diagram for illustrating the entire program according to EMBODIMENT 1. FIGS. 12A to 12D are schematic diagrams and graphs for illustrating the functional block diagram in FIG. 11. Each step of the program will be described with reference to FIG. 11. It should be noted that S201 to S203 in FIG. 11 indicate a way to measure electric currents under the condition that reference coordinates are pointed by one pointer and obtain reference standardized values U[n] and reference normalized values S[n] in advance, and that S204 to S210 in FIG. 11 indicate a way to calculating the position coordinates p and the value of l, which corresponds to the distance between two touch points on a two-point touch, for every detection period. In order to distinguish two normalized values s and d which appear in the functional block diagram, s is denoted as a first normalized value and d is denoted as a second normalized value.

First, reference standardized values U[n] and reference normalized values S[n] are obtained in advance by pointing each set of reference coordinates P[n] by one inspection pointer 23 and measuring electric currents detected under such the condition.

(S201) Electric currents $I_1$ to $I_4$ are obtained for every set of reference coordinates P[n]. Here, $I_1$ to $I_4$ are values that have undergone baseline compensation which removes electric currents accompanied with stray capacity.

(S202) Reference standardized values U[n] are calculated using the electric currents $I_1$ to $I_4$ and are stored in the storage section 103.

(S203) Reference normalized values S[n] are calculated using the electric currents $I_1$ to $I_4$ and are stored in the storage section 103 (see FIGS. 12B and 12D).

Then, the following steps S204 to S210 are performed for every detection period. The purpose is to calculate the position coordinates p described later and an indicator value l corresponding to the distance L between two touch points on a two-point touch to detect a pinch gesture, for every detection period.

(S204) Electric currents $J_1$ to $J_4$ are obtained for every detection period. Here, $J_1$ to $J_4$ are values that have undergone baseline compensation which removes electric currents accompanied with stray capacity.

(S205) Standardized values u are calculated using the electric currents $J_1$ to $J_4$:

$$\vec{u} = \left(\frac{J_2+J_3}{J}, \frac{J_1+J_2}{J}\right), \text{ where } J = \sum_{i=1}^{4} J_i.$$

(S206) Second normalized values d is calculated using the electric currents $J_1$ to $J_4$ (see FIGS. 12A and 12C):

$$\vec{d} = \left(\frac{J_1}{J}, \frac{J_2}{J}, \frac{J_3}{J}, \frac{J_4}{J}\right), \text{ where } J = \sum_{i=1}^{4} J_i.$$

In addition, the electric currents $J_1$ to $J_4$ may be standardized to obtain:

$$\frac{J_3}{J_1+J_3}+\frac{J_2}{J_2+J_4}, \frac{J_1}{J_1+J_3}+\frac{J_2}{J_2+J_4}.$$

(S207) On the basis of the correspondence relation between the reference standardized values U[n] and the reference coordinates P[n] stored in S202, the standardized values u obtained for every detection period in S205 are mapped to position coordinates p.

(S208) On the basis of the correspondence relation between the reference coordinates P[n] and the reference normalized values S[n] stored in S203, the position coordinates p calculated in S207 are mapped to first normalized values s.

(S209) Using the second normalized values d calculated in S206 and the first normalized values s calculated in S208, the value of |d−s| is calculated and is substituted for the indicator value l.

(S210) Pinch gesture is detected on the basis of the time variation of the indicator value l.

Figure 13:
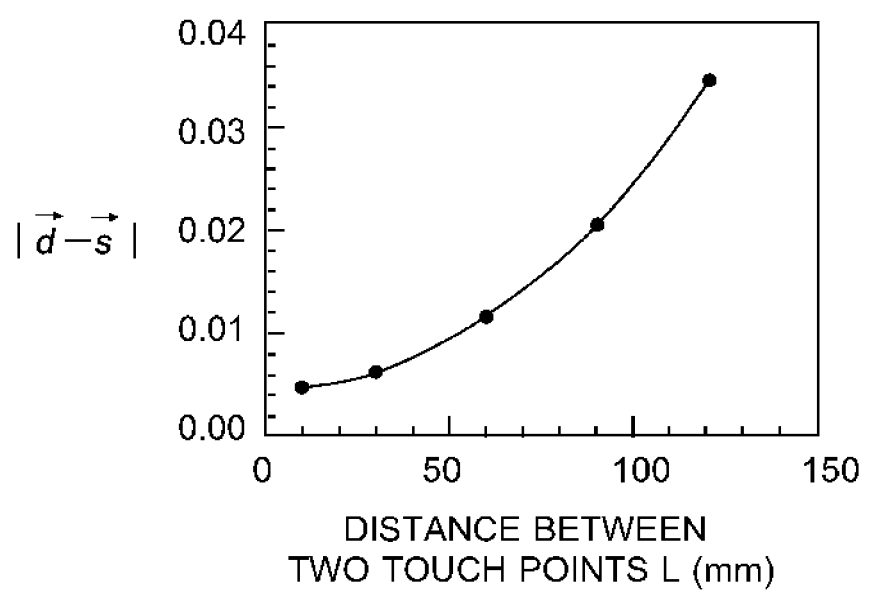
FIG. 13 is a graph illustrating the relation of a distance L between touched points on a two-point touch and an indicator 1.

Pinch Gesture Detection:

In the touch sensor device 100 according to EMBODIMENT 1, the indicator values l have been measured by changing the distance L between two touch points on a two-point touch. FIG. 13 is a graph of the measurement result of the indicator values l. In FIG. 13, the axis of abscissa indicates the distance L between two touch points on a two-point touch, and the axis of ordinate indicates l. As can be seen from FIG. 13, |d−s| changes monotonously with the change of the distance L between two touch points on a two-point touch. That is, by calculating |d−s|, it is possible to obtain the change in the distance L between two touch points on a two-point touch.

Even if there are individual difference in impedance caused by a touch or variation in touch area, the relation between the distance L between two touch points on a two-point touch and the value of |d−s| shown in FIG. 13 does not change. The reason is as follows. The individual difference caused by a touch or the touch area, and the total sum J of the electric currents passing the transparent conductive layer 39 are in a proportional relationship. Accordingly, by normalizing the electric currents $J_m$ (m is an integer; m=1 to 4) passing the detection electrodes 38a to 38d using the total sum J of electric currents, it is possible to offset the individual difference in impedance or the variation in touch area. Here, the indicator value is calculated with l=|d−s| but may be calculated with the following Ex. 10.

$$l = \sum_{i=1}^{ET}(-1)^i(d_i - s_i) \quad \text{(Ex. 10)}$$

In the expression, ET indicates the number of detection electrodes, 38. If ET=4, Ex. 10 turns out to be l=($d_2$−$s_2$)+($d_4$−$s_4$)−($d_1$−$s_1$)−($d_3$−$s_3$). Alternatively, the following Ex. 11 may be used for the calculation. Here, l in Ex. 11 and l in Ex. 10 are substantially the same except that the positive and negative signs are reversed.

$$l = \sum_{i=1}^{ET}(-1)^{i+1}(d_i - s_i) \quad \text{(Ex. 11)}$$

As described above, by employing the program according to EMBODIMENT 1, it is possible to add a function to operate pinch gesture in a touch sensor device that basically supports only single touch operations as in a surface capacitive type touch panel.

It should be noted that, in this embodiment, the number of elements of the vector of the reference normalized values, the vector of the first normalized values, and the vector of the second normalized values is four, respectively, the number of elements of the vector of the reference standardized values and the vector of the standardized values is two, respectively. The number of elements of each of the vector of the reference normalized values, the vector of the first normalized values, and the vector of the second normalized values is larger than the number of elements of each of the vector of the reference standardized values and the vector of the standardized values.

Embodiment 2

Operation and a control method of the touch sensor device 100 and a program for operating the touch sensor device 100 will be described as an example of touch gesture detection according to EMBODIMENT 2. In EMBODIMENT 2, descriptions will be given in detail in particular for a method of detecting a pinch gesture operation on the basis of a change in the distance L[iT] between two touch points on a two-point touch detected in each detection period. It should be noted that, in the subscript [iT] of a variable, T indicates a detection period, and the value of i is incremented like 0, 1, 2, . . . for every detection period.

Figure 14:
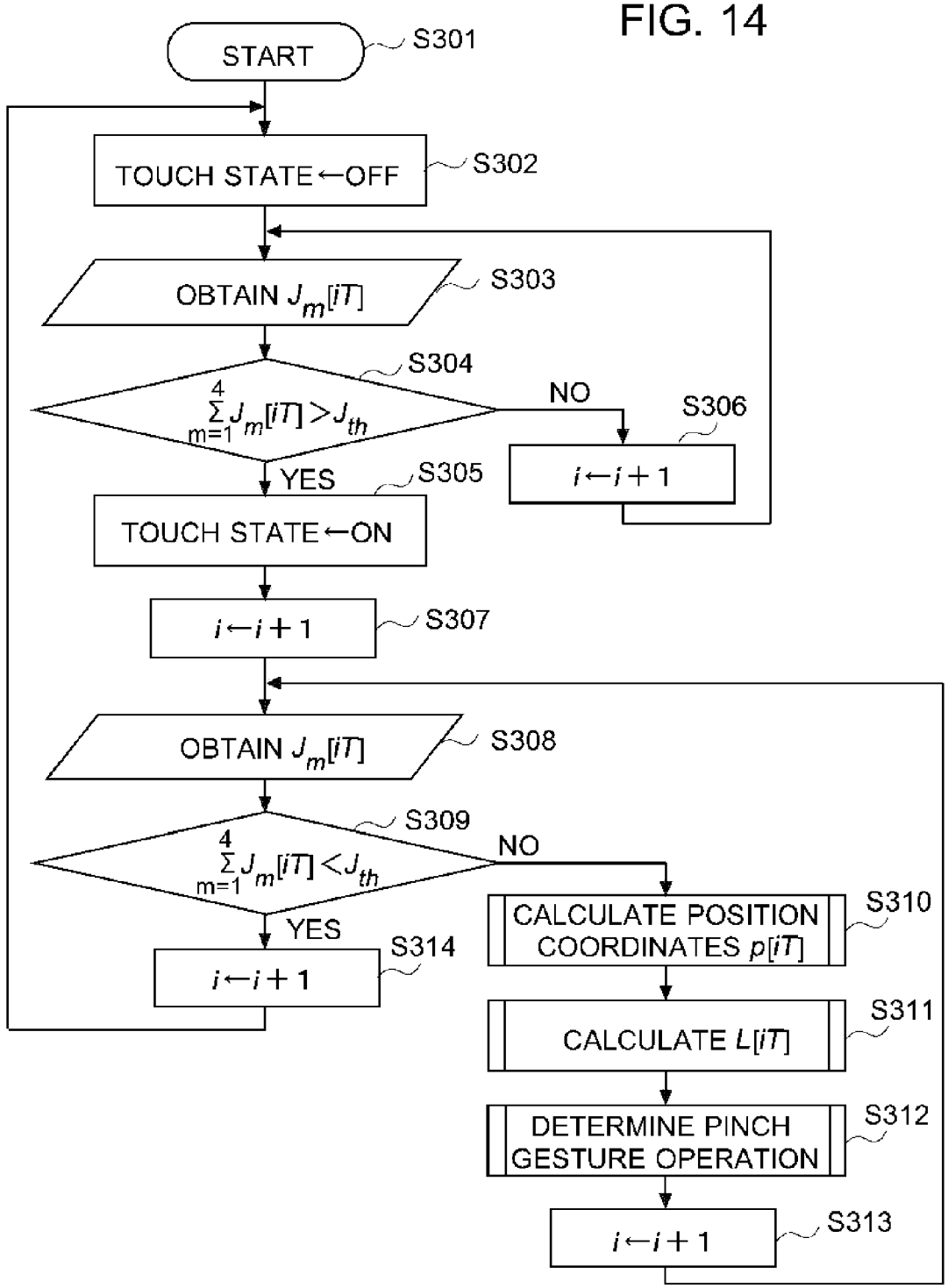
FIG. 14 is a flowchart illustrating a main routine of a program according to EMBODIMENT 2.
Figure 15:
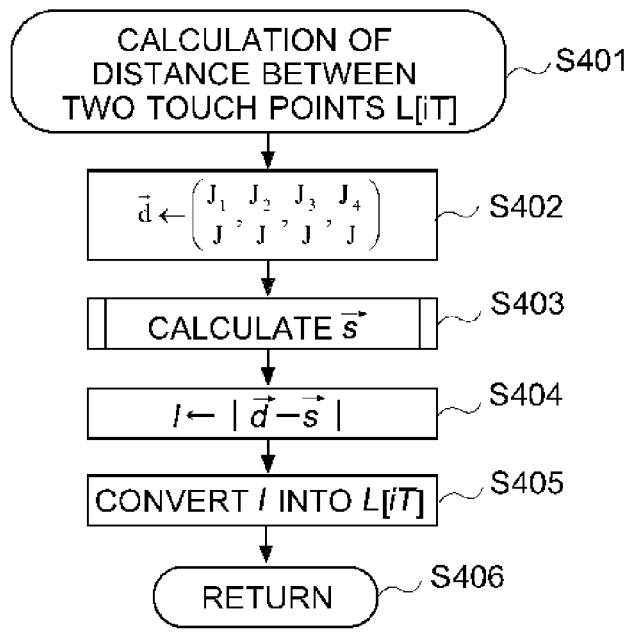
FIG. 15 is a flowchart of a subroutine for calculating a distance L[iT] between touched points on a two-point touch according to EMBODIMENT 2.
Figure 16:
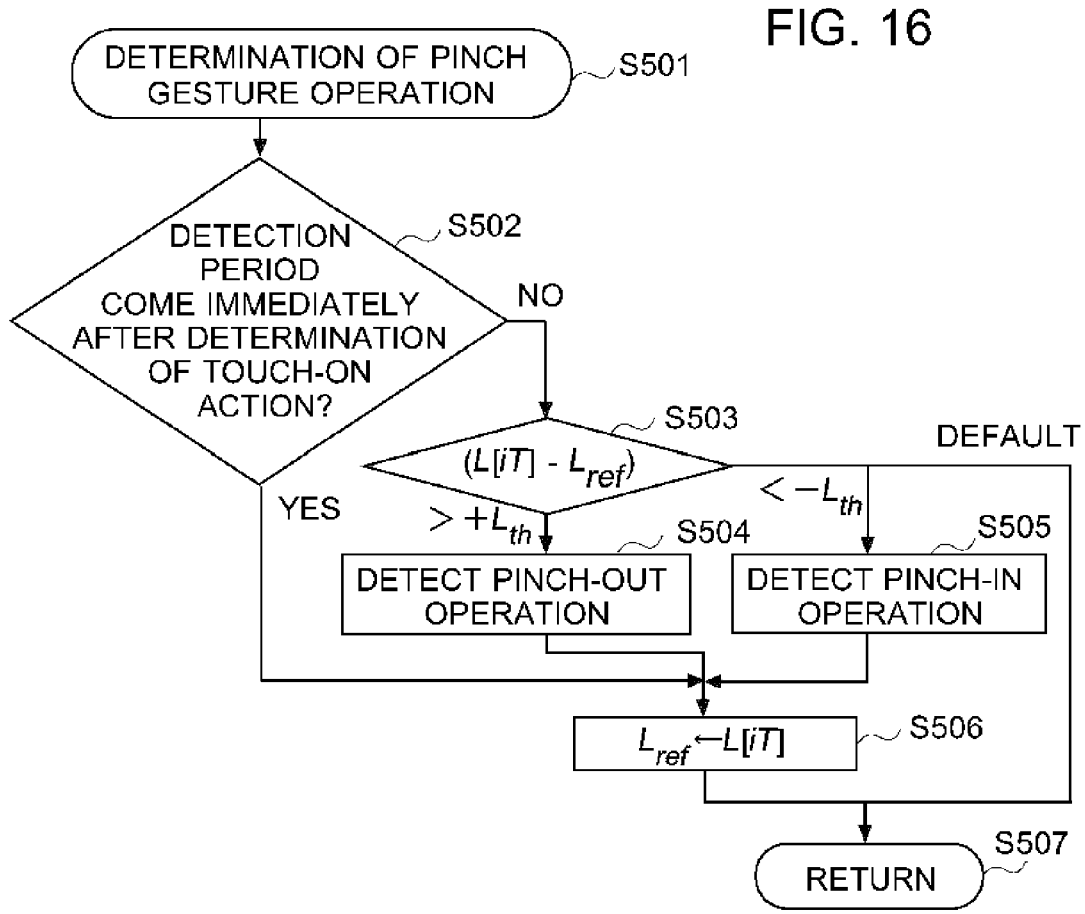
FIG. 16 is a flowchart of a subroutine for detecting a pinch gesture operation according to EMBODIMENT 2.
Figure 19A:
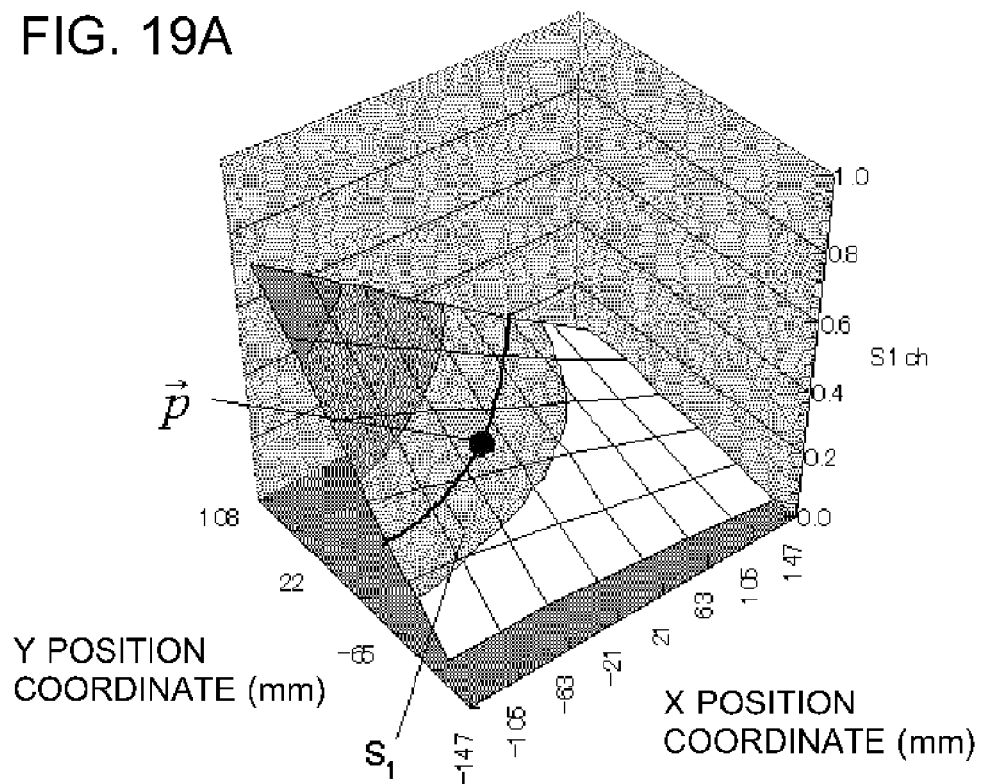
FIGS. 19A to 19I are schematic diagrams illustrating calculation of a normalized value using position coordinates according to EMBODIMENT 3.
Figure 19B:
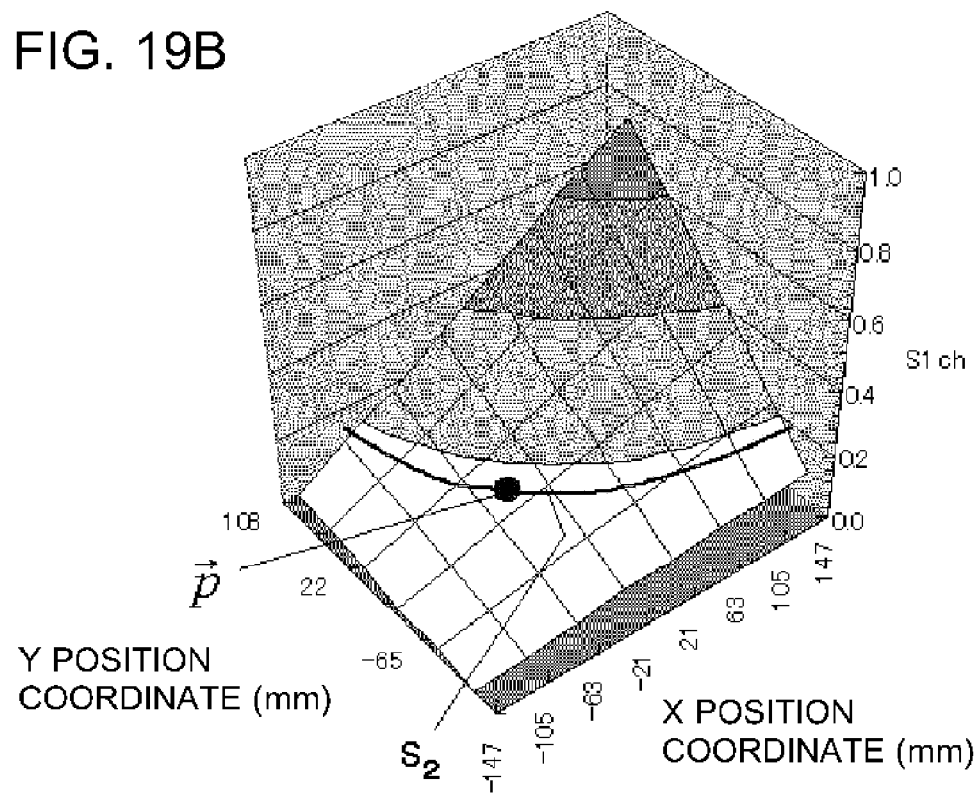
Figure 19C:
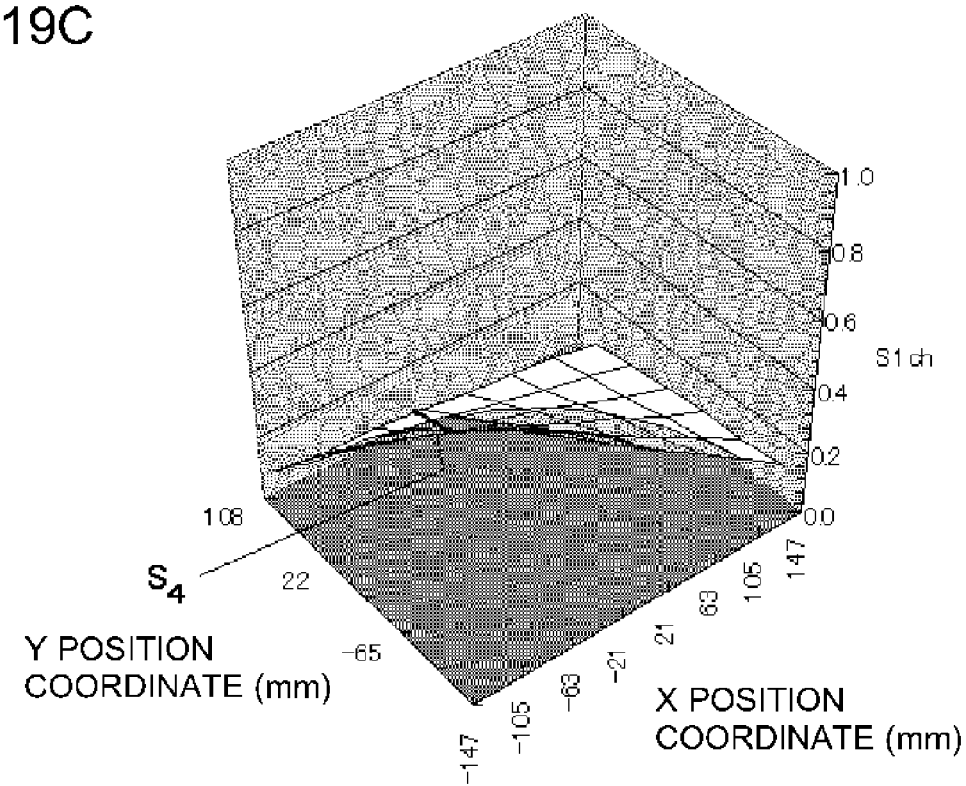
Figure 19D:
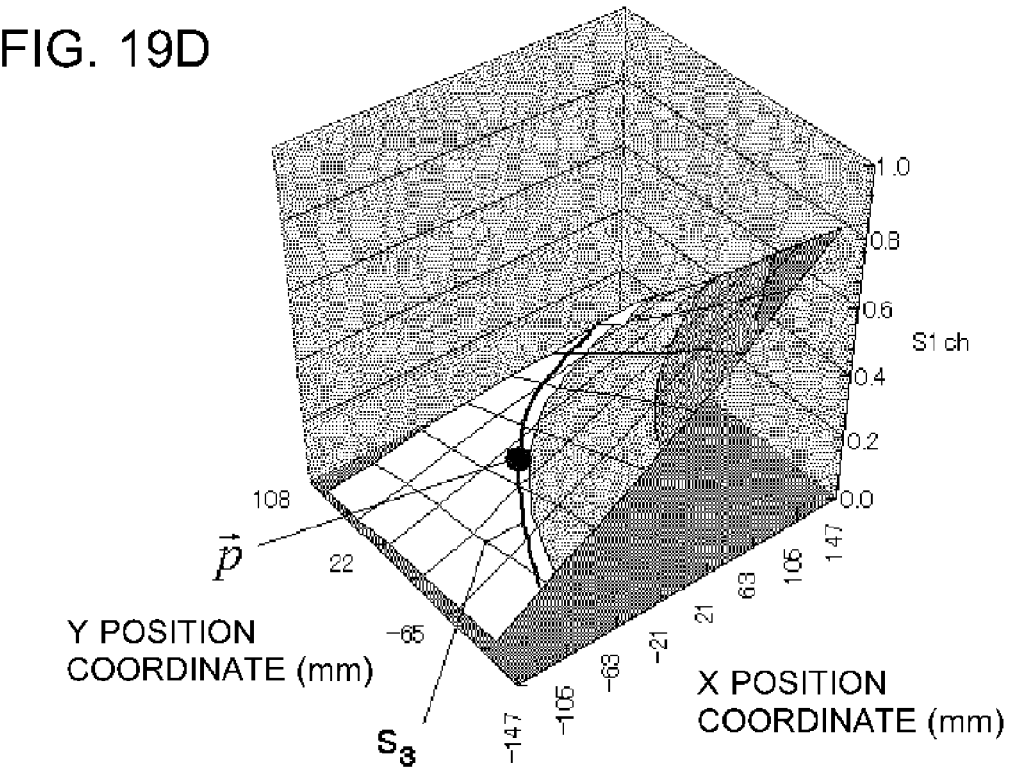
Figure 19E:
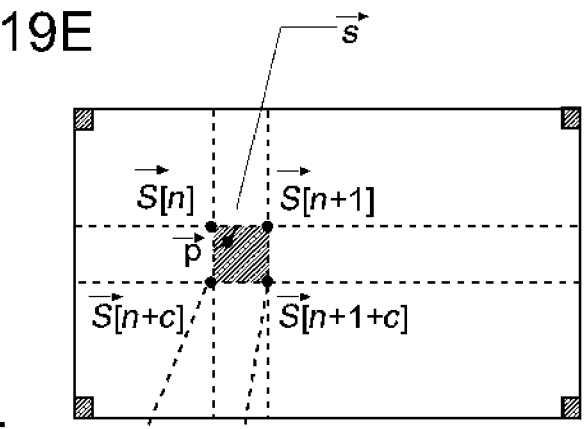
Figures 19F, 19G:
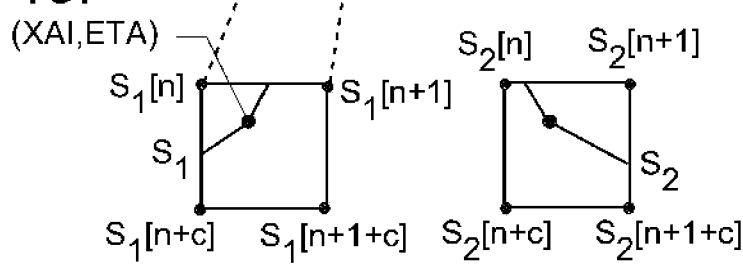
Figures 19H, 19I:
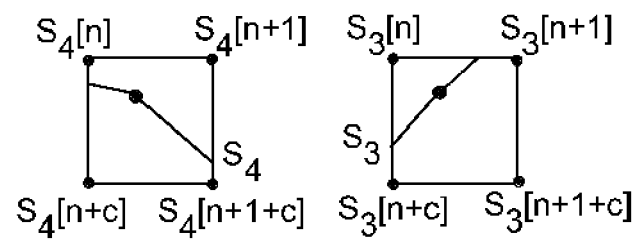

FIGS. 14 to 16 are flowcharts for illustrating operations and a control method of the touch sensor device, and a program for operating the touch sensor device according to EMBODIMENT 2.

FIG. 14 is a flowchart illustrating processing of a main routine of the program according to EMBODIMENT 2. Each step of the program will be described with reference to the embodiment illustrated in FIG. 14.

Processing of the Main Routine:

(S301) The program starts.

(S302) It is determined that the touch state is touch-off.

(S303) Electric currents $J_m$[iT] are obtained. Here, m is an integer and m=1 to 4. Electric currents $J_1$[iT] to $J_4$[iT] are electric currents passing the detection electrodes 38a to 38d.

(S304) It is determined whether the total value of electric currents $J_m$[iT], $$\sum_{m=1}^{4} J_m[iT]$$

is larger than a threshold $J_{th}$ of the touch determination. If the total value of electric currents $J_m$[iT] is larger than the threshold $J_{th}$, the processing proceeds to S305 and it is determined that the touch state is touch-on. If not, the touch-off state is maintained, the processing proceeds to S306, the value of i is incremented, and the processing returns to S303. Here, although a fixed value has been set to the threshold $J_{th}$ of the touch determination in advance, the threshold $J_{th}$ is preferably ½ or less of the total value of the estimated electric currents.

(S305) It is determined that the touch state is touch-on.

(S306) The value of i is incremented.

(S307) The value of i is incremented.

(S308) Electric currents $J_m[iT]$ are obtained.

(S309) It is determined whether the total value of electric currents $J_m[iT]$ is smaller than the threshold $J_{th}$ of the touch determination. If the total value of electric currents $J_m[iT]$ is smaller than the threshold $J_{th}$, the processing proceeds to S314, the value of i is incremented, and then it is determined that the touch state is touch-off in S302. If not, touch-on state is maintained, the processing proceeds to S310, and the position coordinates p are calculated.

(S310) The position coordinates p[iT] are calculated.

(S311) The distance L[iT] between two touch points on a two-point touch is calculated.

(S312) The pinch gesture operation is determined.

(S313) The value of i is incremented. Touch-on state is maintained, and the processing returns to S308.

(S314) The value of i is incremented.

Next, a subroutine for calculating the distance L[iT] between two touch points on a two-point touch, which is the step S311 in the main routine illustrated in FIG. 14, will be described. FIG. 15 is a flowchart of this subroutine. Each step of the program will be described with reference to the embodiment illustrated in FIG. 15.

Calculation of Distance L[iT] between Two Touch Points on a Two-Point Touch:

(S401) The subroutine starts.

(S402) Electric currents $J_m[iT]$ obtained within the same detection period are normalized to obtain the second normalized values d:

$$\vec{d} = \left(\frac{J_1}{J}, \frac{J_2}{J}, \frac{J_3}{J}, \frac{J_4}{J}\right), \text{ where } J = \sum_{i=1}^{4} J_i.$$

(S403) The first normalized values s are calculated.

(S404) The value of |d−s| is calculated and substituted for the indicator value l.

(S405) The indicator value l is converted into L[iT]. Here, the relation between the distance L between two touch points on a two-point touch and the indicator value l illustrated in FIG. 13 has been measured in advance, and the conversion is performed using the relational expression. For example, obtaining an approximate polynomial expression of the distance L between two touch points on a two-point touch and the indicator value l has been obtained in advance, or a look up table (LUT) of the distance L between two touch points on a two-point touch and the indicator value l has been created in advance, and then, the distance L[iT] between two touch points on a two-point touch is outputted by using the expression or the table.

(S406) The subroutine ends and returns the value of L[iT].

Next, a subroutine for determining a pinch gesture operation, which is the step S312 in the main routine shown in FIG. 14, will be described. FIG. 16 is a flowchart of this subroutine. Each step of the program will be described with reference to the embodiment illustrated in FIG. 16.

Determination of the Pinch Gesture Operation:

(S501) The subroutine starts.

(S502) If the current detection period i is immediately after a touch determination, that is, a first detection period coming after the touch determination, the processing proceeds to S506. If not, the processing proceeds to S503.

(S503) After deducting a distance comparison value $L_{ref}$ from the distance L[iT] between two touch points on a two-point touch, the obtained value is compared with a threshold $L_{th}$ of distance. Specifically, possible situations of the comparison result are grouped in the following cases (1) to (3), and one of the cases is performed.

(1) If $(L[iT]-L_{ref})$ is larger than $+L_{th}$, the processing proceeds to S504.

(2) If $(L[iT]-L_{ref})$ is smaller than $-L_{th}$, the processing proceeds to S505.

(3) In other cases $(-L_{th}<=L[iT]-L_{ref}<=+L_{th})$, the situation is a default situation in the categorization, and thus the processing proceeds to S507 directly without detecting a pinch-in or pinch-out operation.

(S504) A pinch-out operation is detected. If a pinch-out operation is detected, a pinch-out flag is set ON. If this flag is ON, resolution of the selected image is increased.

(S505) A pinch-in operation is detected. If a pinch-in operation is detected, a pinch-in flag is set ON. If this flag is ON, resolution of the selected image is reduced.

(S506) If the current detection period i is immediately after the touch determination or if a pinch-in or a pinch-out operation has been detected, L[iT] is substituted for $L_{ref}$ which is a reference distance value. That is, $L_{ref}$ is updated. Then, $(L[iT]-L_{ref})$ becomes zero to be reset.

(S507) This subroutine ends.

According to EMBODIMENT 2, it is possible to perform a pinch gesture operation on the basis of the change in distance L[iT] between two touch points on a two-point touch.

Embodiment 3

An operation and a control method of the touch sensor device 100, and a program for operating the touch sensor device 100 will be described as an example of touch gesture detection according to EMBODIMENT 3. In EMBODIMENT 3, a calculation method of first normalized values s corresponding to a touch point under the assumption that a distance between a plurality of touch points is zero will be described in detail. It should be noted that a step for calculating the first normalized values s corresponds to the step S403 in the flowchart in FIG. 15.

FIGS. 17A to 19I are schematic diagrams and graphs of the calculation method of the first normalized values s according to EMBODIMENT 3. FIGS. 17A, 17B, 18A and 18B are schematic diagrams relating to calculation of the position coordinates p. FIGS. 19A to 19I illustrates calculation of the first normalized value s based on the position coordinates p.

The description will be provided with reference to schematic diagrams illustrating a process of searching the lattice regions illustrated in FIGS. 17A and 17B. In the graph in FIG. 17A, the axis of abscissa is $U_1$ and the axis of ordinate is $U_2$, where the reference standardized values are given as $U[n]=(U_1, U_2)$. The graph in FIG. 17A plots reference standardized values U[n] having been obtained by sequentially pointing at plural sets of the reference coordinates P[n] at 48 locations with one inspection pointer 23 in advance, and plots the standardized values u obtained for each detection period. Here, the reference standardized values U[n] are arranged in the similar order to the order of arrangement of the reference coordinates P[n] in the vertical and horizontal directions, and thus the reference standardized values U[n] correspond to estimated coordinates. The point of the standardized values u obtained for each detection period is included in any one of the lattice regions (polygons) each surrounded by four reference standardized values.

In FIG. 17B, the axis of abscissa is the x-coordinate and the axis of ordinate is the y coordinate. The unit coordinate system surrounded by the reference coordinates P[n] of the four points forms a rectangle. The unit coordinate system (col, row) at the most upper left in FIG. 17B is defined by col=0 and row=0, and col=0 to 8 from left to right, and row=0 to 6 from up to down. It should be noted that, in the graph in FIG. 17A, the unit coordinate system (col=3, row=3) in the graph in FIG. 17B corresponds to the lattice region including the standardized values u obtained for each detection period.

FIGS. 18A and 18B illustrate a mapping relation between the lattice region including the standardized values u obtained for each detection period, and the unit coordinate system. On the basis of the correspondence relation of the reference standardized values U[n] and the reference coordinates P[n] stored in advance, the standardized values u obtained for each detection period are mapped to the corresponding position coordinates p. In FIG. 18A, the lattice region including u is assumed as the lattice region (col, row). Two vertices on the left end of the lattice region (col, row) are assumed as $U[n]=(U_1[n], U_2[n])$ and $U[n+c]=(U_1[n+c], U_2[n+c])$. Here, the subscript c is the number of reference coordinates in the horizontal direction (c=8).

Further, the corresponding vertices at the reference coordinates P[n] of the unit coordinate system are assumed as (−1, +1) to (−1, −1) (see FIG. 18B). If the standardized values $u=(u_1, u_2)$ obtained for each detection period is mapped to (XAI, ETA) on the unit coordinate system, the standardized values u are given by the following interpolation function (Ex. 12). On the basis of the four numerical values (col, row) and (XAI, ETA) obtained in FIGS. 17A, 17B, 18A and 18B, the position coordinates p are calculated.

$$\vec{u}=\{(1-XAI)*(1+ETA)*\vec{U}[n]+(1+XAI)*(1+ETA)*$$
$$\vec{U}[n+1]+(1+XAI)*(1-ETA)*$$
$$\vec{U}[n+1+c]+(1-XAI)*(1-ETA)*\vec{U}[n+c]\}/4 \quad \text{(Ex. 12)}$$

FIGS. 19A to 19D illustrate four contour graphs. In each of the graphs, the x axis and the y axis are X[n] and Y[n] of the reference coordinates $P[n]=(X[n], Y[n])$, respectively. The z axes of the graphs indicate elements of the reference normalized values S[n] of the step S106 in FIG. 9, respectively:

$$\vec{S}[n] = (S_1, S_2, S_3, S_4) = \left(\frac{I_1}{I}, \frac{I_2}{I}, \frac{I_3}{I}, \frac{I_4}{I}\right), \text{ where } I = \sum_{i=1}^{4} I_i.$$

In the graphs, each of the values of $S_1$ to $S_4$ approaches asymptotically to 1 as the position coordinates approach to the corresponding detection electrode, and approaches asymptotically to 0 as the position coordinates recede from the detection electrode. When plotting the position coordinates $p=(x, y)$ calculated in each detection period in the each contour graph, a contour line passing through the position coordinates p corresponds to the first normalized values s.

Any one of the lattice regions each surrounded by S[n] to S[n+c] includes the position coordinates p. On the basis of the reference normalized values S[n] corresponding to lattice points of the lattice region including position coordinates p, and (XAI, ETA) obtained by Ex. 12, the first normalized values s are calculated using an interpolation function shown in Ex. 13.

$$\vec{s}=\{(1-XAI)*(1+ETA)*\vec{S}[n]+(1+XAI)*(1+ETA)*$$
$$\vec{S}[n+1]+(1+XAI)*(1-ETA)*$$
$$\vec{S}[n+1+c]+(1-XAI)*(1-ETA)*\vec{S}[n+c]\}/4 \quad \text{(Ex. 13)}$$

According to EMBODIMENT 3, the coordinates of the touch point in a case where the distance between two touch points on a two-point touch is zero are assumed to be position coordinates p, and thus it is possible to obtain the first normalized values s by mapping the position coordinates p. Since the first normalized values s change continuously with the change in the position coordinates p, the resolution is advantageously unrestricted. Further, there is less computational complexity since only the calculation of substituting (XAI, ETA) obtained in Ex. 12 into Ex. 13 is needed, which is also advantageous. Time to calculate the first normalized values s according to EMBODIMENT 3 is, for example, 0.1 millisecond, which is sufficiently short as compared to the touch detection period (3 milliseconds), and thus it can be said that this processing is practical.

Embodiment 4

In EMBODIMENT 4, a countermeasure for a case of erroneous detection of a touch gesture in a touch sensor device 100 including an algorithm of the present invention will be described. FIGS. 20A to 20C are schematic diagrams illustrating the countermeasure. FIG. 20A is a schematic diagram illustrating a gesture to perform a drag operation which can, for example, scroll a screen, and FIGS. 20B and 20C are schematic diagrams illustrating pinch gestures which can change the resolution of a display screen.

In a case where a user performs a drag operation to move a user's fingertip on the surface of the touch panel 101 while touching the surface with the fingertip, which corresponds to a drag operation with a mouse, to, for example, scroll the screen currently displayed as illustrate in FIG. 20A, such operation may be erroneously detected as, for example, a pinch-in or the pinch-out operation and the resolution of a selected image may be changed against the intention of the user who operates the touch sensor device.

The inventor analyzed this issue as follows. In the drag operation, the touching fingertip and the position coordinates p are at substantially the same position, and thus when the fingertip moves greatly on the surface of the touch panel 101, the calculated position coordinates p changes greatly also.

Meanwhile, when a user performs a pinch gesture operation using, for example, the user's thumb and index finger as illustrated in FIGS. 20B and 20C, the position of the midpoint of the thumb and the index finger is substantially fixed although the coordinates of the fingertips change. Since the position coordinates p are detected near the middle of touches at two points, change in the position coordinates p is small as compared to the change in the coordinates of the fingertips.

That is, a gesture of a drag operation with a user's fingertip shown in FIG. 20A, makes a relatively great change of the calculated position coordinates p; and a pinch gesture with user's fingertips shown in FIGS. 20B and 20C, makes a relatively small change of the calculated position coordinates p.

In view of the above-described relationship of gestures and the calculated position coordinates p, the touch gesture detection section 108 invalidates the detection of a pinch gesture (pinch-in or pinch-out operation) when the position coordinates p move by a certain amount (threshold $L_{th}$ of the distance between two points) or more. The condition for invalidation is shown in Ex. 14. Alternatively, the condition in Ex. 14 may be added to a condition for finally detecting a pinch gesture.

(Change in the position coordinates $p$)>(threshold $L_{th}$ of the distance between two points) (Ex. 14)

Here, the step of the invalidation is the step S503 in the flowchart of the subroutine for determining the pinch gesture operation according to EMBODIMENT 2 illustrated in FIG. 16. It is possible to prevent an unintended event when a pinch gesture is erroneously detected in EMBODIMENT 4.

Embodiment 5

Another embodiment of the arrangement of the detection electrodes 38a to 38d in the touch sensor device according to EMBODIMENT 5 will be described. An example that detection electrodes 38a to 38d are arranged at the four corners of the touch panel 101 has been described using FIG. 4 and others. However, the detection electrodes 38a to 38d may be arranged in any locations on four sides (outer circumference) of the touch panel 101, respectively. Each of FIGS. 21A and 21B is a top schematic view of the arrangement of the detection electrodes 38a to 38d. FIG. 21A illustrates an embodiment that the detection electrodes 38a to 38d are arranged at the four corners of the touch panel 101. FIG. 21B illustrates an embodiment that the detection electrodes 38a to 38d are arranged in the middle of respective sides of the touch panel 101. The standardized values (estimated coordinates) in the case of arranging the detection electrodes 38a to 38d at the four corners as illustrated in FIG. 21A are given as:

$$\vec{u} = \left(\frac{J_2 + J_3}{J}, \frac{J_1 + J_2}{J}\right), \text{ where } J = \sum_{i=1}^{4} J_i.$$

The standardized values (estimated coordinates) in the case of arranging the detection electrodes 38a to 38d in the middle of the respective sides as illustrated in FIG. 21B are given as:

$$\vec{u} = (u_1, u_2) = \left(\frac{J_2}{J_2 + J_4}, \frac{J_1}{J_1 + J_3}\right).$$

Here, an element $u_1$ of the standardized values indicates a ratio of the electric currents passing the right and left electrodes (38d, 38b) of the touch panel 101, and an element $u_2$ of the standardized values indicates a ratio of the electric currents passing the upper and lower electrodes (38a, 38c) of the touch panel 101. With respect to the indicator value l for detecting touch gesture, it is possible to use l=|d−s| in all the examples of two top schematic views illustrated in FIGS. 21A and 21B.

Each of FIGS. 22A and 22B illustrates a top schematic view related to the detection electrodes and peripheral lines. In FIGS. 22A and 22B, the protective layer 37 (FIG. 4) is omitted for simplicity. FIG. 22A illustrates a case where the detection electrodes 38a to 38d are arranged at the four corners of the touch panel 101. FIG. 22B illustrates a case where the detection electrodes 38a to 38d are arranged in the middle of respective sides of the touch panel 101. The detection electrodes 38a to 38d are formed on the transparent conductive layer 39. The detection electrodes 38a to 38d are connect to peripheral lines 8 (there are four lines in FIGS. 22A and 22B). The detection electrodes 38a to 38d and the peripheral lines 8 are formed of material with sufficiently low resistance, such as silver, as compared to the transparent electrically-conductive layers 39. A part of the transparent conductive layer 39 under the peripheral lines 8 is removed. The peripheral lines 8 and the transparent conductive layer 39 are not connected directly but are connected via the detection electrodes 38.

Here, there may be low resistance patterns on the periphery of the transparent conductive layer 39 other than the detection electrodes 38a to 38d. Lower resistance patterns other than the detection electrodes 38a to 38d are not directly connected to the peripheral lines 8. That is, the patterns are isolated (not illustrated). Examples of such an isolated pattern include a linearization pattern which linearizes the electric field applied to the transparent conductive layer 39 in the x-coordinate (horizontal) direction and the y direction of the touch panel 101.

In FIGS. 22A and 22B, after extending the peripheral lines 8 along the periphery of the touch panel 101 from the detection electrodes 38a to 38d and bringing them together in one place, the lines 8 are connected to the FPC 7. The FPC 7 is connected to the controller 21.

As described above, even if the arrangement location of the detection electrodes 38a to 38d is changed, it is possible to detect the position coordinates and detect the touch gesture, and thus it is possible to improve the degree of freedom of arrangement of the detection electrodes. In addition, the present embodiment can be implemented even if the locations of the electrodes are changed freely other than at the corner or in the middle of the sides according to the usage.

Embodiment 6

The touch sensor device according to EMBODIMENT 6 is directed to another embodiment that has a different number of detection electrodes 38. FIGS. 23A to 23C illustrate top schematic views relating to the various numbers ET of the detection electrodes 38. FIGS. 23A to 23C illustrate examples of the number of detection electrodes ET=3, 4 and 8 in this order. Though the detection electrode 38d located in the lower left of the touch panel 101 is omitted in the example of ET=3 (FIG. 23A) as compared to the example of ET=4 (FIG. 23B), it is possible to detect the position coordinates and detect a touch gesture in the example of ET=3. Meanwhile, in the example of number of detection electrodes ET=8 (FIG. 23C), the detection electrodes 38e to 38h are formed in the middle of the sides of the touch panel 101, respectively, in addition to the detection electrodes 38a to 38d at the four corners of the touch panel 101. As the number of detection electrodes increases, it is possible to improve the detection accuracy of position coordinates and the detection accuracy of a touch gesture. The present embodiment can be implemented even if the number of electrodes is changed according to the usage.

EXAMPLES

Example 1

Operations of the touch sensor device 100 having an algorithm according to one aspect of the present invention will be described in EXAMPLE 1. A pinch gesture operation has been performed on the surface of the touch panel 101 in FIG. 4 while the touch sensor device 100 is working, and electric currents $J_m$ passing the detection electrodes 38a to 38d are measured. FIGS. 24 to 31 are graphs relating to the operations of EXAMPLE 1. In FIGS. 24 to 31, the axis of abscissa indicates the time progress t, and numerical values of the axis of ordinate are values of electric currents measured simultaneously with each other during the operations of the touch sensor device 100. Here, it is assumed that the size of the touch panel 101 is 15 inches, silicon dioxide $SiO_2$ is used for the protective layer 37, and its film thickness is 3 μm.

FIG. 24 illustrates a time variation of the total value J of electric currents passing the transparent conductive layer 39 according to EXAMPLE 1. During when the elapsed time is 0 to 1.1 seconds, the total value J of electric currents is several μA, which is a small value. The surface of the touch panel 101 is sufficiently apart from the human body including a finger. Thus, the electric currents accompanied with other stray capacity have undergone baseline compensation to be canceled.

Next, the total value J of electric currents has increased abruptly to about 50 μA at elapsed time of 1.1 to 1.2 seconds. Since the threshold $J_{th}$ of the touch determination has been set to $J_{th}$=25 μA, the condition of $J>J_{th}$ is met so that the touch state is set to ON. The sudden increase of the total value J of electric currents and the touch of two fingers and the surface on the touch panel 101 are synchronized.

Next, at 4.2 seconds and later, the total value J of electric currents has decreased abruptly and became substantially zero. The condition of $J<J_{th}$ is met so that the touch state is switched to OFF. The abrupt decrease of the total value of the electric currents J is synchronized with the separation of the two fingers from the surface of the touch panel 101.

FIG. 25 illustrates a time variation of each of the electric currents $J_m$ passing the detection electrodes 38a to 38d according to EXAMPLE 1. At elapsed time of 1.2 seconds, the two fingers touched the touch panel with the two fingers separated from each other so that the distance L between two touch points on a two-point touch is L=120 mm along a diagonal line connecting the detection electrode 38a and the detection electrode 38c.

At elapsed time of 1.2 to 4.1 seconds during a pinch gesture operation, there is a change in each electric current $J_m$. In EXAMPLE 1, it is assumed that the middle of two points on a two-point touch is fixed in the center of the display section even if the distance L between two touch points on a two-point touch is changed.

At elapsed time of about 1.8 seconds, two fingers started to get closer and the distance L between two touch points became L=10 mm at about 2.6 seconds. Further, at elapsed time of about 3.4 seconds, the two fingers started to be separated from each other again and the distance L between two touch points on a two-point touch became L=120 mm at about 3.9 seconds.

FIG. 26 illustrates a time variation of the detected position coordinates p according to EXAMPLE 1. The value of the position coordinates p are not calculated when the touch state is OFF and the position coordinates p are calculated only when the touch state is ON. Thus, only the position coordinates p when the touch state is ON are plotted in the graph. It should be noted that only the values outputted in a touch-on state are plotted in each of FIGS. 27 to 31 shown below, too.

When the distance between two touch points on a two-point touch changes from L=10 mm to L=120 mm, individual touching fingers move by about 40 mm (=(120−10)/ $2^{1/2}$/2) in the x-coordinate direction (horizontal direction) or the y coordinate direction (vertical direction) on the touch panel but the change in the detected position coordinates p was about 10 mm, which is as small as one fourth of the actual motions of the fingers. Such smallness of the change in the position coordinates p is the reason for assuming the position coordinates p as a touch point where the distance between two touch points on a two-point touch L=0.

FIG. 27 illustrates a time variation of the second normalized values d according to EXAMPLE 1. The values of $d_1$ to $d_4$ were relatively close to each other when two fingers were pinched-in (t=2.8 seconds, L=10 mm) but the values of $d_1$ to $d_4$ were uneven (t=1.2 or 3.9 seconds, L=120 mm) when two fingers were pinched-out.

FIG. 28 illustrates a time variation of the first normalized values s according to EXAMPLE 1. Differences in the values of $s_1$ to $s_4$ are small as compared to those of $d_1$ to $d_4$ irrespective of the distance L between two touch points on a two-point touch.

FIG. 29 illustrates values of $(d_m-s_m)$ obtained by subtracting the first normalized values s from the second normalized values d according to EXAMPLE 1. Depending on the distance L between two touch points on a two-point touch, there are remarkable changes in $(d_m-s_m)$.

FIG. 30 illustrates a time variation of |d−s| according to EXAMPLE 1. Similarly to FIG. 29, there are remarkable changes in |d−s| depending on the distance L between two touch points on a two-point touch.

FIG. 31 illustrates a time variation of the distance L[iT] between the detected two touch points on a two-point touch according to EXAMPLE 1. As compared to the values of the distance between actual two touch points on a two-point touch from L=10 mm to 120 mm, the values of the detected distance L[iT] were near values in general. Here, the detected distance L[iT] is an average calculated by using values of L[iT] in ten sections. That is, a moving average calculated for ten movement sections is assigned to the detected distance L[iT].

An example whose number of touches is two has been described in EXAMPLE 1. However, the number of touches may be three or more. When the number of touches is three, a thumb, an index finger and a middle finger may be used, for example. The indicator value of the gesture changes as the touch points approach or recede with respect to the center of gravity position of the three touching points.

As described above, in EXAMPLE 1, the operation of the touch sensor device 100 having the algorithm according to one aspect of the present invention has been described with reference to the measured values upon the pinch gesture operation.

Example 2

In EXAMPLE 2, the function of a pinch gesture operation of the touch sensor device 100 has been inspected. The top schematic view under the situation is illustrated in FIG. 32. Here, the size of the touch panel 101 was 15 inches, and the screen aspect ratio (ratio of horizontal/vertical length) was 4:3.

Referring to FIG. 32, the detection electrodes 38a to 38d are formed at four corners of the touch panel 101, and two inspection pointers 23 touch with the touch panel 101. An angle formed by a line that connects the detection electrodes 38b and 38d and a line that connects two inspection pointers 23 is defined as angle $\theta_e$. The indicator values l are calculated while changing the angle $\theta_e$ in a range of 180 degrees from −37 degrees to 143 degrees. In this calculation, it is assumed that the middle point of two inspection pointers 23 is the center of the display section, and the indicator values l is calculated for each of two cases of the distance L between two inspection pointers, L=57 mm and 114 mm. Further, using Ex. 10 in EMBODIMENT 1, the indicator values l are calculated with $l=(d_2-s_2)+(d_4-s_4)-(d_1-s_1)-(d_3-s_3)$. Here, $d_1$ to $d_4$ indicate elements of second normalized values $d=(d_1, d_2, d_3, d_4)$ obtained in each detection period, and $s_1$ to $s_4$ indicate elements of first normalized values $s=(s_1, s_2, s_3, s_4)$ that is measured and stored in advance.

FIG. 33 illustrates a relation between the indicator values l and the angles $\theta_e$ according to FIG. 32. In the graph of FIG. 33, the axis of abscissa is angle $\theta_e$, and the axis of ordinate is the indicator value $l=(d_2-s_2)+(d_4-s_4)-(d_1-s_1)-(d_3-s_3)$.

In the graph, both curves of the distances between two touch points on a two-point touch L=57 mm and L=114 mm had sine wave shapes whose one cycle period is 180 degrees. Under the assumption that these curves are sinusoidal waves, the amplitude of the curve in the case of L=114 mm is larger than that in the case of L=57 mm. As for a change in the indicator value l with a change in the distance between two touch points on a two-point touch from L=57 mm to L=114 mm, the change in the indicator value l is relatively large around angle $\theta_e=0$ degree and angle $\theta_e=90$ degrees, and is far smaller around angle $\theta_e=45$ degrees and angle $\theta_e=135$ degrees.

In FIG. 33, the indicator values l were calculated to make the graph. Alternatively, the number of times of events, such as changing the resolution of the selected image, may be counted. Specifically, the distance threshold $L_{th}$ was set to 50 mm, two-point touch operations were conducted with the distance L between two touch points changed from 10 mm to 120 mm, and the number of times of detection of a pinch-out operation was counted through visual inspection. At this time, the touch sensor device displayed a screen of an application software which can change the display magnification stepwise as in 100%, 125%, 150%, and 200%.

The counted number of times of a pinch-out operation is 2 at angles $\theta_e=0$ degree and $\theta_e=90$ degrees. Meanwhile, the counted number of times of a pinch-out operation was zero at angles $\theta_e=45$ degrees and $\theta_e=135$ degrees. However, by reducing the distance threshold $L_{th}$, pinch-out operations could be detected at angles $\theta e=45$ degrees and $\theta_e=135$ degrees.

It should be noted that the angles $\theta_e=45$ degree and $\theta_e=135$ degrees can be expressed as the first angle $\theta_e=(2\times m-1)\times 180/ET$. Here, ET is the number of the above-described detection electrodes, and m is an integer where m=1, 2, ..., ET. On the other hand, angles $\theta_e=0$ degree and $\theta_e=90$ degrees can be expressed as the second angle $\theta_e=360/ET\times(m-1)$.

Thus, in the touch sensor device of the present example, detection sensitivity is different depending on the angle $\theta_e$. Further, in another example illustrated in the FIG. 21B that the detection electrodes 38a to 38d are formed in the middle of respective sides of the touch panel 101, the same result as the angle $\theta_e$ dependency of the indicator value l on the angle $\theta_e$ shown in FIG. 33 could also be obtained. Thus, in EXAMPLE 2, the function about the pinch gesture operations of the touch sensor device 100 having the algorithm according to one aspect of the present invention has been confirmed.

Example 3

In EXAMPLE 3, a pinch gesture operation is performed on each of the touch sensor devices described in EMBODIMENT 1 to EMBODIMENT 3 so as to verify whether or not correct detection can be achieved in a region distant from the center of the display section.

FIG. 34 illustrates an example of the evaluation positions on the surface of the display section, and the direction and the range of the distance change between touch points at each of the evaluation positions. Here, the origin (0 mm, 0 mm) of the graph in FIG. 34 is assumed to be the center of the display section, the range of the axis of abscissa (X axis) is −152 mm to +152 mm, the range of the axis of ordinate (Y axis) is −114 to +114 mm, and the entire graph is dealt with a 15 inches display section. The distance L between two touch points was changed in the direction of illustrated in FIG. 34 (the direction of "/"), at each of dots at the nine locations in FIG. 34 (black squares in FIG. 34), where each of the dots is the center of the change. In other words, locus of the change was illustrated with each of nine slanting lines in FIG. 34. The coordinates of the center points at the time of evaluation were given as A (−105 mm, −65 mm) to I (+105 mm, +65 mm) illustrated in FIG. 34, and the measurement was performed by changing the distance L between two touch points on a two-point touch from 8 mm to 120 mm.

The following indicator value $l_{ds}$ was calculated for the each evaluation point on the basis of Ex. 10, and the relation between the indicator value $l_{ds}$ and the distance L between two touch points on a two-point touch was illustrated in FIG. 35:

$$l_{ds} = \sum_{i=1}^{ET}(-1)^i(d_i - s_i).$$

where ET=4 and the first normalized values $s=(s_1, s_2, s_3, s_4)$ and the second normalized values $d=(d_1, d_2, d_3, d_4)$.

Meanwhile, the following indicator value $l_d$ was calculated for the each evaluation point on the basis of Ex. 15 which uses only the second normalized values d, in order to compare the calculation result with that of FIG. 35:

$$l_d = \sum_{i=1}^{ET}(-1)^i d_i. \quad \text{(Ex. 15)}$$

Here, the indicator values obtained by Ex. 10 and Ex. 15 are denoted as $l_{ds}$ and $l_d$, respectively, in order to distinguish the indicator values calculated with Ex. 10 and Ex. 15.

FIG. 36 illustrates a relation between the indicator value $l_d$ and the distance L between two touch points on a two-point touch. First, even if the distance L is 8 mm, which is short, the measurement points near the four corners of the panel in FIG. 34 show a condition where the indicator value $l_d$ is deviated from zero greatly. That is, these measurement points show a condition where the offset of the indicator value $l_d$ is very large. Specifically, at the lower left in the panel: A (−105 mm, −65 mm); and the upper right in the panel: I (+105 mm, +65 mm), the indicator value $l_d$ is about 0.3, which is far greater than the changes (0.07 or less) in the indicator values $l_d$ when the distance L between two touch points on a two-point touch is changed from 8 mm to 120 mm. Meanwhile, at the lower right: C (+105 mm, −65 mm) of the panel, and the upper left: G (−105 mm, +65 mm) of the panel, the indicator value $l_d$ is about −0.3, which is a negative value whose absolute value is large.

Meanwhile, when the indicator values $l_{ds}$ are plotted as illustrated in FIG. 35, under the condition that the distance L between two touch points on a two-point touch is as short as 8 mm, the indicator value $l_{ds}$ is substantially 0 at each of the nine locations in the panel surface. This is far small as compared with the changes (0.07 or less) in the indicator values $l_{ds}$ when the distance L between two touch points on a two-point touch is changed from 8 mm to 120 mm. In addition, the indicator values in FIG. 35 have almost the same value at nine locations in the panel surface. Thus, it can be said that the distance L between two touch points on a two-point touch can be obtained at each of nine locations including the periphery of the display section, by calculating the indicator value $l_{ds}$ are calculated using the first normalized values s.

Next, the direction that changes the distance between two touch points on a two-point touch has been changed as illustrated in FIG. 37 (in the "\" direction) and the similar evaluation has been conducted. In the evaluation in FIG. 37, conditions other than the directions of distance change being different are the same as those of FIG. 34. FIG. 38 illustrates the relation between the indicator value $l_{ds}$ obtained by using the first normalized values s and the second normalized values d, and the distance L between two touch points on a two-point touch. Meanwhile, FIG. 39 illustrate the relation between the indicator value $l_d$ calculated by using only the second normalized values d and the distance L between two touch points on a two-point touch to be compared with that of FIG. 38. The inventor confirmed that that the distance L between two touch points on a two-point touch can be calculated for locations in the periphery of the display section also even if the direction of distance change is different from that of FIG. 34 as illustrated in FIG. 37.

Hereinafter, the relation between two types of indicator value and the distance between two points on a two-point touch according to EXAMPLE 3 will be described with reference to FIGS. 35, 36, 38 and 39. FIGS. 36 and 39 illustrate graphs about the indicator value $l_d$ and FIGS. 35 and 38 illustrate graphs about the indicator value $l_{ds}$. Among these graphs, there is a difference between the graphs of FIGS. 36 and 39 and between the graphs of FIGS. 35 and 38 in the direction to open and close the two fingers, in other words, in the direction to change the distance between two touch points on a two-point touch (the "/" direction and the "\" direction).

Though FIGS. 36 and 39 show a great difference in characteristics coming from a difference in location within the panel surface is very large, this difference is notably reduced in FIGS. 35 and 38. This represents an advantageous effect of using the indicator value $l_{ds}$. Here, in order to use the indicator value $l_{ds}$, it is necessary to calculate the first indicator values s.

Next, a distance between two touch points on a two-point touch is obtained by using the relation between the distance and the indicator value obtained on the basis of the results illustrated in FIG. 35 and FIG. 38, where the relation is a relation of the indicator value $l_{ds}$ calculated in each detection period at the position of E(0, 0), that is, the center of the display section, and the distance L between two touch points on a two-point touch. As shown in FIG. 40, although there is a difference of indicator values in positive/negative sign according to the changing direction of the distance, the distance can be determined uniquely from the indicator value obtained by the measurement. For example, both $l_{ds}$=−0.04 and $l_{ds}$=+0.04 indicate L=90 mm. If the relation between the distance L between two touch points on a two-point touch and the indicator value $l_{ds}$ has been obtained in advance by measurement similarly to FIG. 13, the indicator value can be converted into the distance L between two touch points on a two-point touch with the relational expression.

The present invention has been described with reference to the embodiments and examples in the above. However, the present invention is not limited to the above embodiments or examples. The structure and details of the present invention can be modified in various manners that can be understood by one skilled in the art. In addition, suitable combinations of a part or all of the structure of the above embodiments and examples are within the scope of the present invention.

According to the touch sensor devices described in the above embodiments and examples, even if they employ a structure which supports only a single touch, as disclosed in JP-B No. H01-019176, it is possible to modify such a structure to support multi-touch at low cost.

The present invention can be used for a surface display device that detects a position coordinates pointed using a pointer on the display screen, or a surface display device that detects occurrence of a pointing operation. In addition, examples of practical use of the present invention include a game machine, a personal digital assistant (PDA), a car navigation device, a notebook PC, a portable DVD player, a video game machine attached to a seat in an airplane or a bus, and a touch sensor function used for factory automation (FA) instruments.

The invention claimed is:

1. A touch sensor device comprising:
   a transparent conductive layer configured to include an impedance surface, the impedance surface including an active area where a human body touches or approaches;
   a plurality of detection electrodes arranged on the impedance surface;
   a detection circuit configured to detect electric currents flowing into the detection electrodes;
   a memory configured to store reference standardized values, and reference normalized values, and reference coordinates at a plurality of locations in the active area,
   each of the reference standardized values being a ratio of a first value to a second value, the first value obtained by performing arithmetic processing on at least two detected electric currents detected by the detection circuit on each of the reference coordinates being pointed with one pointer, the second value obtained by performing arithmetic processing on at least four detected electric currents detected by the detection circuit on each of the reference coordinates, the reference coordinates being pointed with one pointer, the reference standardized values corresponding to the reference coordinates, respectively,
   each of the reference normalized values being calculated by normalizing the detected electric currents so as to make a total sum of the electric currents flowing through the impedance surface a constant value, for each of the reference coordinates, each of the reference normalized values corresponding to the reference coordinates, respectively, and
   a central processing unit (CPU) configured to obtain standardized values by calculating a ratio of a third value to a fourth value in a detection period, the third value obtained by performing arithmetic processing on at least two detected electric currents detected b the detection circuit, the fourth value obtained by detection circuit, map the standardized values onto position coordinates according to a correspondence between the reference standardized values and the reference coordinates, map the position coordinates onto first normalized values according to a correspondence between the reference coordinates and the reference normalized values, calculate second normalized values by normalizing the electric currents detected by the detection circuit in each detection period, and detect a motion of a plurality of pointers on a basis of a time variation of the first normalized values and the second normalized values.

2. The touch sensor device of claim 1, wherein
each of a number of elements of the reference normalized values, a number of elements of the first normalized values, and a number of elements of the second normalized values is greater than a number of elements of the reference standardized values, and
each of the number of elements of the reference normalized values, the number of elements of the first normalized values, and the number of elements of the second normalized values is greater than a number of elements of the standardized values.

3. The touch sensor device of claim 2, wherein
each of the number of elements of the reference normalized values, the number of elements of the first normalized values, and the number of elements of the second normalized values is four.

4. The touch sensor device of claim 2, wherein
each of the number of elements of the reference standardized values and the number of elements of the standardized values is two.

5. The touch sensor device of claim 1, wherein
the impedance surface has a rectangular shape with four sides, and
the detection electrodes are arranged in at least one of: at four corners of the rectangular shape, at middles of the four sides of the rectangular shape, and at the four corners and at the middles of the four sides of the rectangular shape.

6. The touch sensor device of claim 1, wherein
the CPU is configured to,
on one pointer touching or approaching the impedance surface, calculate a pointing position of the one pointer as the position coordinates, and
on two pointers touching or approaching the impedance surface, calculate a position in the middle of the two pointers as the position coordinates.

7. The touch sensor device of claim 1, wherein
either the first normalized values or the position coordinates are calculated by using an interpolation function for carrying out interpolation using a polygon surrounded by points represented by the reference normalized values.

8. The touch sensor device of claim 1, wherein
the CPU is configured to detect the motion of the plurality of pointers using an indicator value l obtained by $$l = \sum_{i=1}^{ET} (-1)^i (d_i - s_i),$$

where $s_i$ represents the first normalized values, $d_i$ represents the second normalized values, and ET represents the number of detection electrodes.

9. The touch sensor device of claim 1, wherein
the CPU is configured to
calculate a distance between two pointers that touch or approach the impedance surface by using the first normalized values and the second normalized values, and
detect a pinch gesture operation in which the two pointers move away from each other or move closer to each other, by using a time variation of the distance between the two pointers.

10. The touch sensor device of claim 9, wherein
the CPU is configured to calculate the distance between the two pointers by using an absolute value of a difference between the first normalized value and the second normalized value.

11. The touch sensor device of claim 9, wherein
the CPU is configured to define the distance between the two pointers as a reference distance value, the distance being calculated immediately after determining a touch state of the pointers such that the pointers touch or approach the impedance surface as a touch-on state.

12. The touch sensor device of claim 11, wherein
the CPU is configured to, on detecting a pinch-in operation that reduces the distance between the two pointers or a pinch-out operation that increases the distance between the two pointers, update the reference distance value by assigning the distance between two pointers to the reference distance value.

13. The touch sensor device of claim 9, wherein
the CPU is configured to invalidate detection of a pinch-in operation that reduces the distance between the two pointers or a pinch-out operation that increases the distance between the two pointers when a change of the position coordinates coming from a change of the distance between the two pointers is greater than a predetermined threshold value.

14. An electronic device including the touch sensor device of claim 1.

15. The touch sensor device of claim 1, wherein the performing arithmetic processing includes addition and multiplication.

\* \* \* \* \*